United States Patent [19]

Finlay et al.

[11] Patent Number: 4,841,453
[45] Date of Patent: Jun. 20, 1989

[54] MULTIDIRECTIONAL SCAN AND PRINT CAPABILITY

[75] Inventors: David E. Finlay; Stephen D. Hanna, both of Boulder; David C. Stevenson, Longmont; John T. Varga, Boulder, all of Colo.

[73] Assignee: IBM Corporation, Armonk, N.Y.

[21] Appl. No.: 929,036

[22] Filed: Nov. 10, 1986

[51] Int. Cl.$^4$ ............................................. G06F 15/40
[52] U.S. Cl. ................................. 364/519; 364/518; 340/731; 340/750
[58] Field of Search ............... 364/518, 519; 382/46; 340/731, 724, 750

[56] References Cited

U.S. PATENT DOCUMENTS

| | | | |
|---|---|---|---|
| 3,630,336 | 12/1971 | Johnson et al. | 197/113 |
| 3,729,714 | 4/1973 | Heard | 340/172.5 |
| 3,976,982 | 8/1976 | Eiselen | 340/172.5 |
| 3,999,168 | 12/1976 | Findley et al. | 340/172.5 |
| 4,000,486 | 12/1976 | Schomburg | 340/172.5 |
| 4,054,948 | 10/1977 | Grier et al. | 364/900 |
| 4,079,458 | 3/1978 | Rider et al. | 364/900 |
| 4,225,249 | 9/1980 | Kettler | 400/3 |
| 4,257,711 | 3/1981 | Nakajima | 400/306 |
| 4,312,045 | 1/1982 | Jean et al. | 364/900 |
| 4,437,121 | 3/1984 | Taylor et al. | 358/160 |
| 4,554,638 | 11/1985 | Iida | 364/521 |
| 4,566,002 | 1/1986 | Miura et al. | 340/727 |
| 4,590,585 | 5/1986 | Cummings et al. | 364/900 |
| 4,627,097 | 12/1986 | Finlay et al. | 382/46 |
| 4,635,212 | 1/1987 | Hatazawa | 364/518 |
| 4,655,622 | 4/1987 | Aoki | 400/121 |
| 4,694,405 | 9/1987 | Bradbury et al. | 364/518 |

FOREIGN PATENT DOCUMENTS 0188678  7/1986  European Pat. Off. ............... 382/46

OTHER PUBLICATIONS

"Shift Register System for Image Orientation"-Gold et al., IBM Tech. Dis. Bulletin, vol. 18, No. 8, 1/76.
Datillo et al., "Proportional Spacing Raster Printer Character Generator", IBM Technical Disclosure Bulletin, vol. 15, No. 8, Jan. 1973, pp. 2365-2366.

Primary Examiner—Gary V. Harkcom
Assistant Examiner—Phu K. Nguyen
Attorney, Agent, or Firm—Pollock, Vande Sande & Priddy

[57] ABSTRACT

A character generator with multidirectional scan and variable line and character (or symbol) size capability. Universality is implemented by producing a serial binary stram which can be used to print or display in any of eight combinations of scan direction and progression, that is, for scan direction left to right, or vice versa, progressing up or down, or scan direction top to bottom or vice versa, progressing left or right. In formatting the serial binary stream, a font is accessed (for basic symbol definition), which selectively provides for orthogonal scans of the symbol definitions. Variable line size is implemented by terminating a symbol row (or line) based on a predetermined size criteria regardless of the comparable font dimension and "filling" up to the line size to the extent the corresponding font dimension is less than the predetermined size criteria. Variable character (or symbol) size is implemented by independently multiplying the effect of a symbol definition by selected (integral) factors, in orthogonal directions. The general architecture includes a font table (for symbol definition), an address/escape (A/E) table, defining symbol size for comparison with line size parameters, a character position escape (CPE) table to define a leading character or symbol on each line and a page buffer (PB) memory defining the characters (symbols) in the document and their relationship with other characters (symbols). Access to the CPE table allows access to the PB, from there to the A/E table and from there to the font allows extraction of selected and appropriate portions of the symbol definition to make up the binary system.

15 Claims, 18 Drawing Sheets

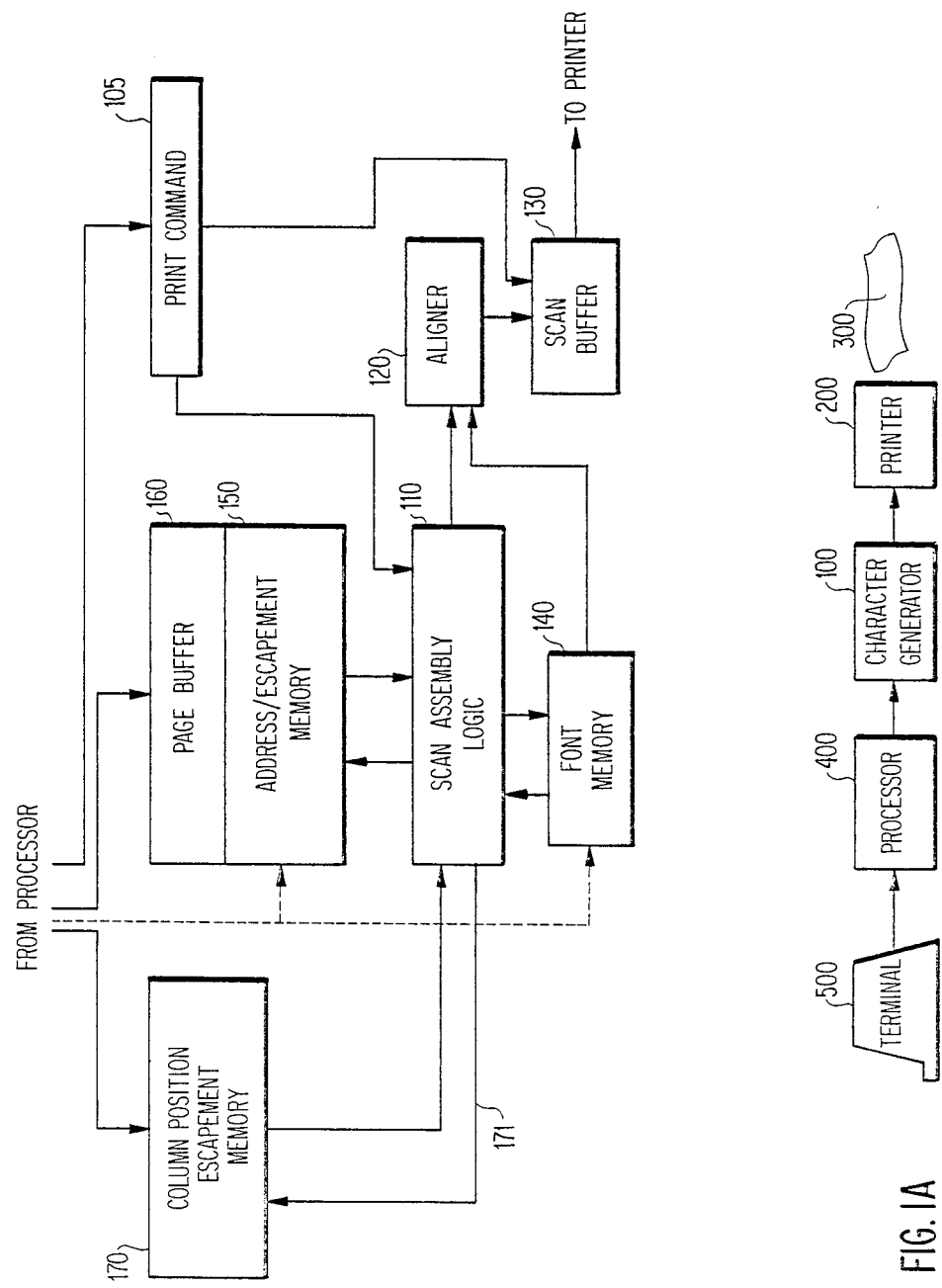

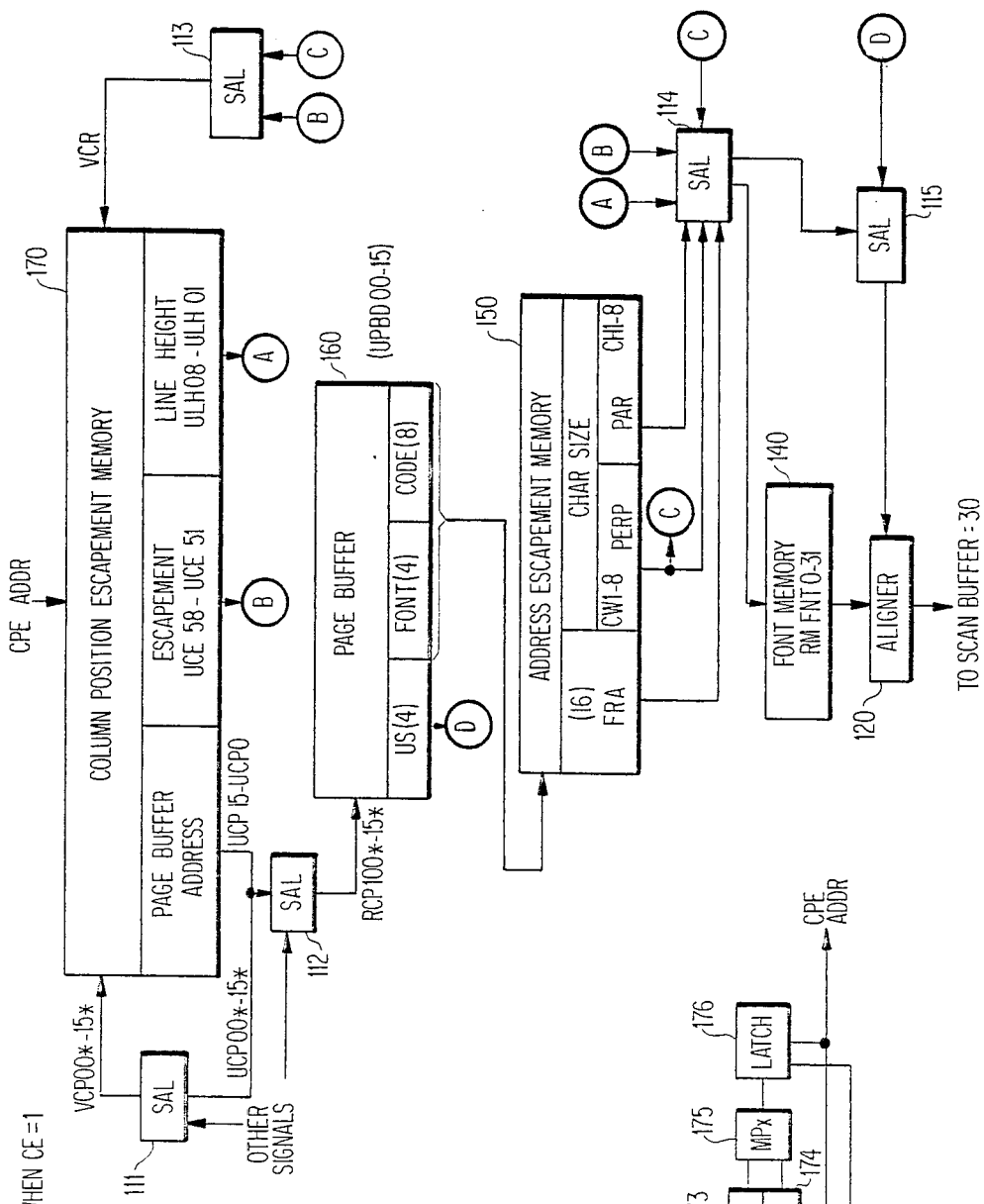

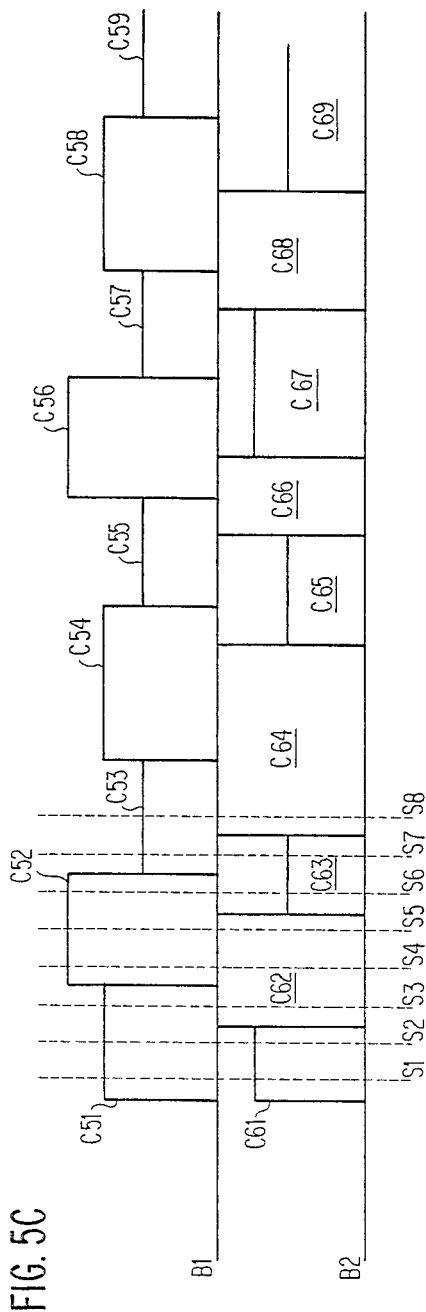

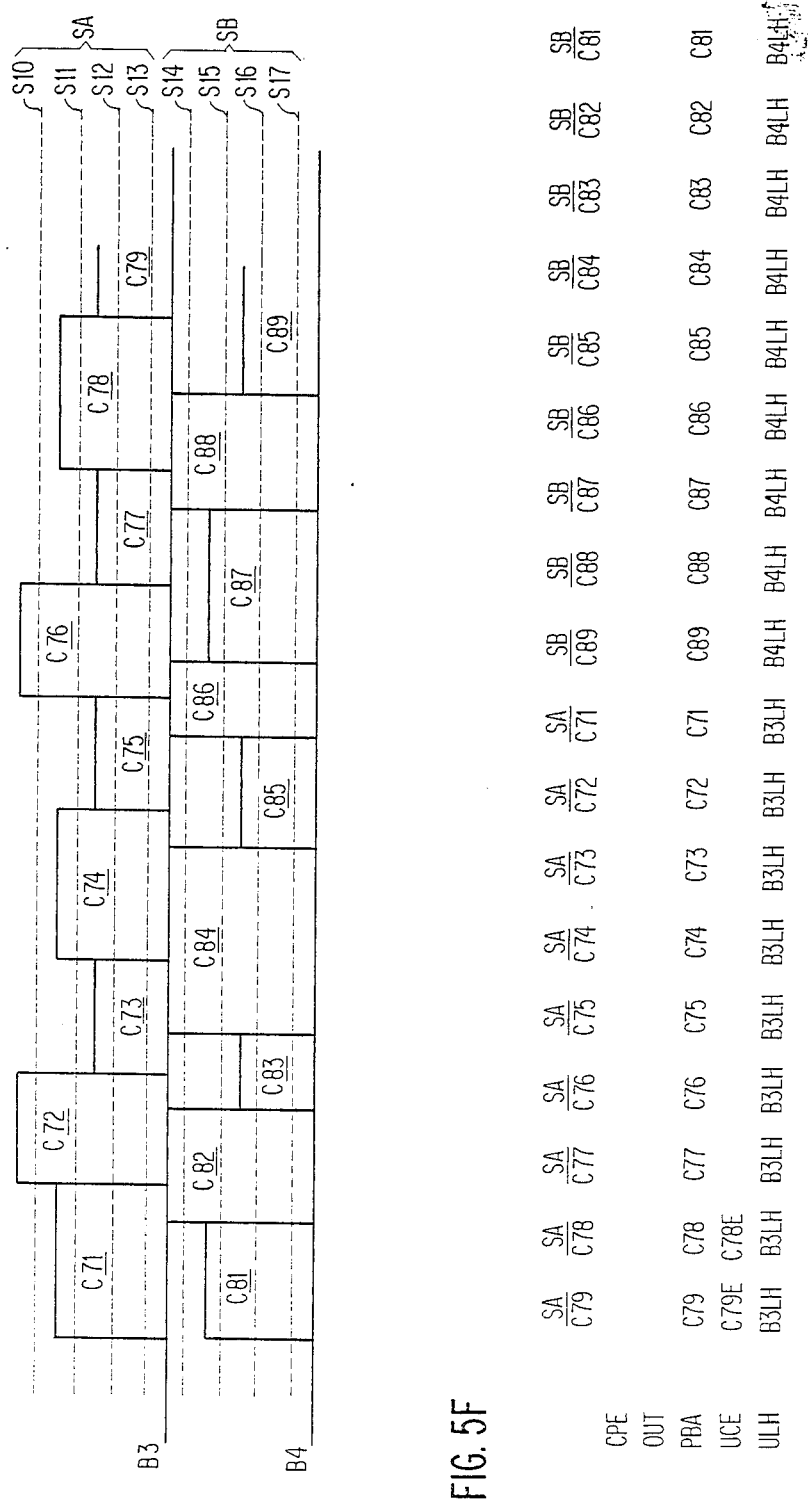

FIG. 7

| | | PB | | |
|---|---|---|---|---|
| | | CONTENTS | | |
| PBA | | US | FONT | CODE |
| PBA1<br>PBA2<br>PBA3 | | | AE17<br>AE25<br>AE33 | LINE 1 |
| PBA 22<br>PBA 23<br>PBA 24 | | | AE32<br>AE17<br>AE6 | LINE 2 |
| PBA 45<br>PBA 46<br>PBA 47 | | | AE9<br>AE6<br>AE14 | |
| PBA 69<br>PBA 70 | | | AE33<br>AE17 | LINE 3 |

FIG. 6

| | CPE | |
|---|---|---|
| | CONTENTS | |
| PBA | UCE | ULH |
| PBA1 | 00 | LH1 |
| PBA 23 | 00 | LH2 |
| PBA 41 | 00 | LH3 |
| PBA 70 | 00 | LH4 |

SCAN ASSEMBLY LOGIC TIMING (INITIAL SCAN CYCLES)

FIG. 9 (SAL 111, SAL 112, SAL 114)

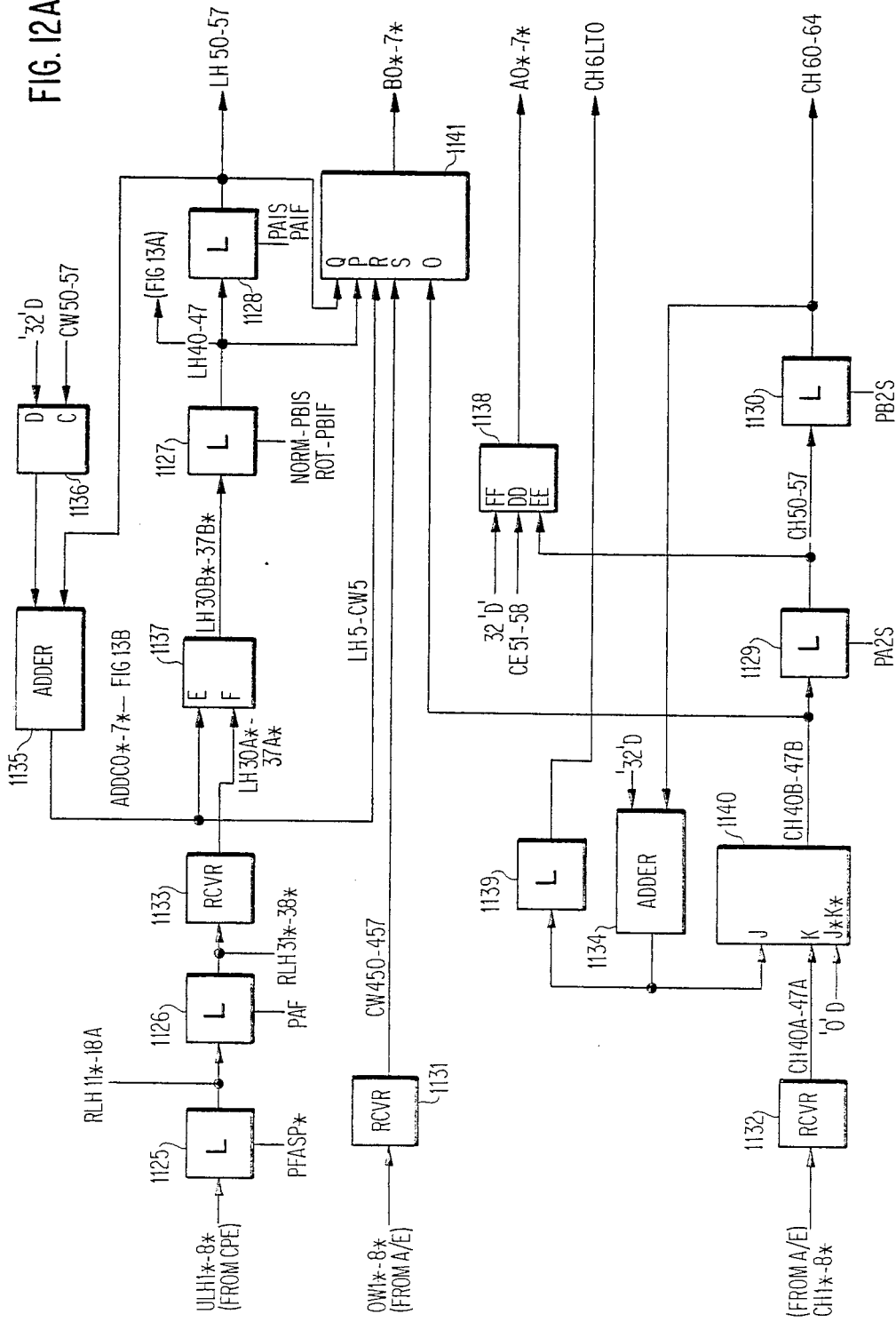

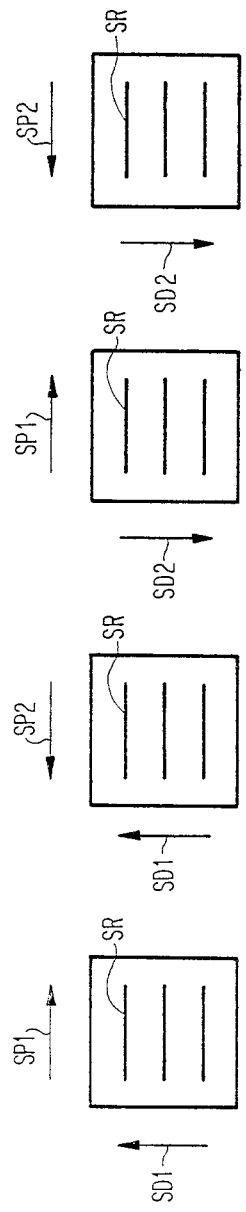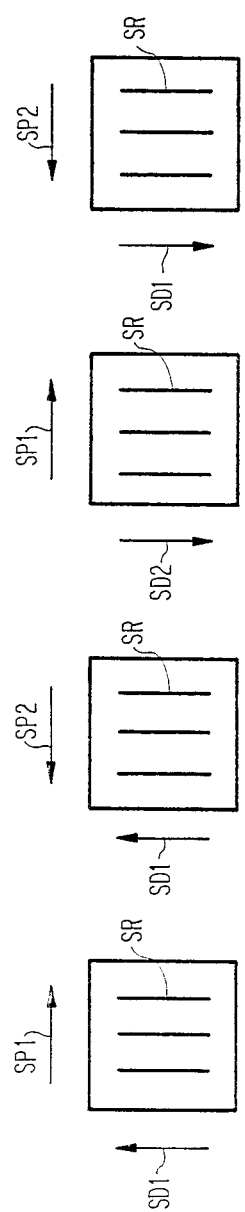

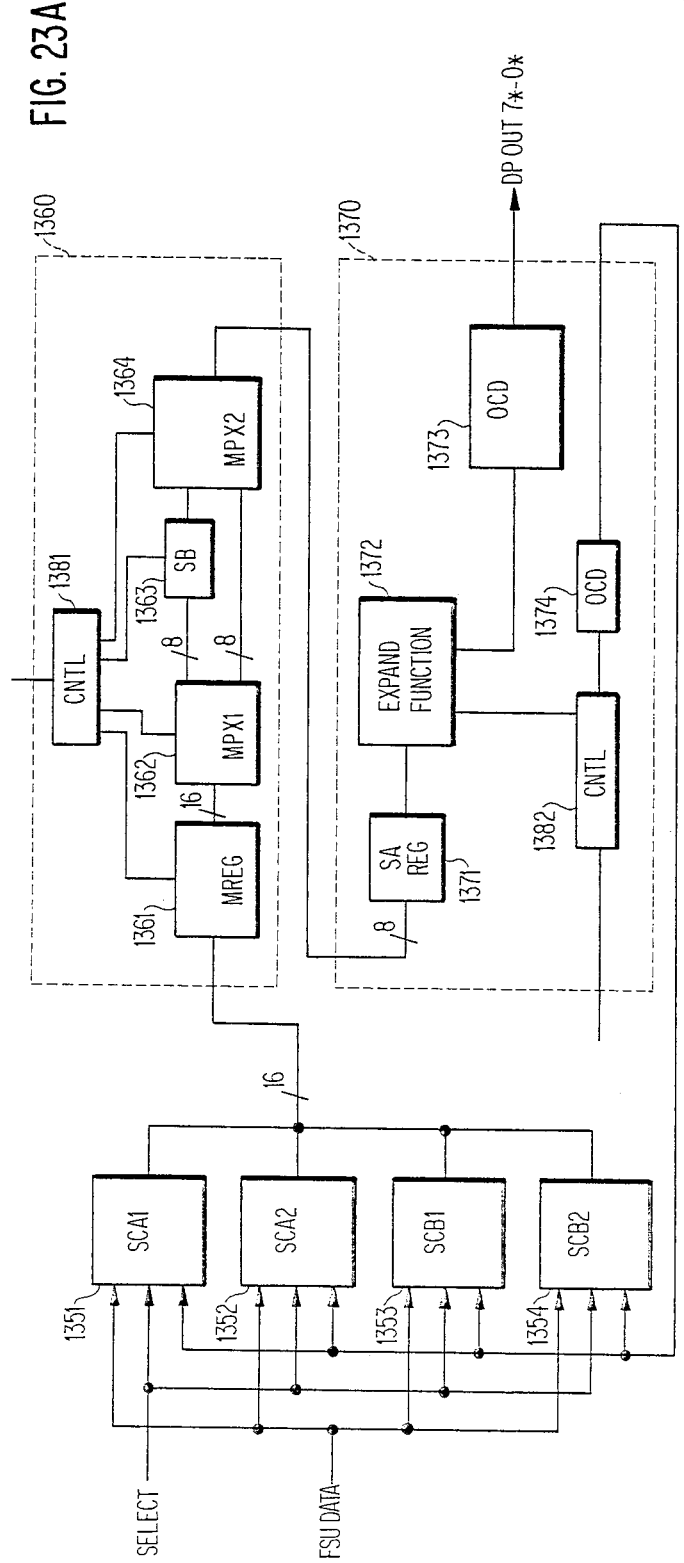
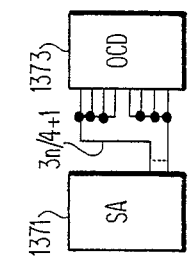
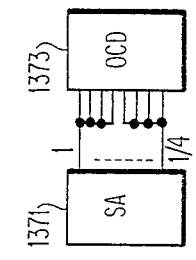
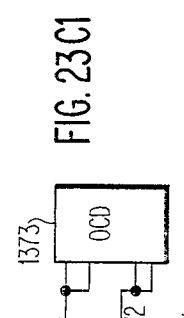
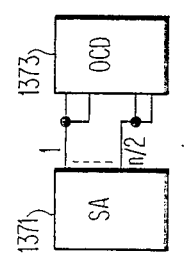
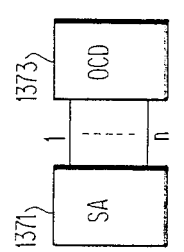

MULTIDIRECTIONAL SCAN AND PRINT CAPABILITY

DESCRIPTION

Technical Field

The present invention relates to imaging devices such as printers and more particularly a base line type character generator for such a printer which has many attributes of more complex all points addressable type devices.

CROSS-REFERENCE TO RELATED APPLICATION

Reference is made to copending application Dominguez, Jr. et al U.S. Ser. No. 929,030, filed Nov. 10, 1986, entitled "Multidirectional Scan and Print Capability", and assigned to the assignee of this application.

Background Art

Prior art electrophotographic printers are shown in U.S. Pat. Nos. 3,999,168; Findley et al., 4,000,486 Schomburg, and 4,079,458 Rider et al.

These references describe not only the basic electrophotographic printer, but how that printer can be used, in an effective fashion to print documents in either what is called portrait or landscape modes, see in particular FIGS. 2 and 3 of U.S. Pat. No. 4,079,458. Thus in portrait mode, the rows of alphanumerics or other symbols (hereinafter simply called symbols) are parallel to the short edge of the document whereas in landscape mode the rows of alphanumerics or symbols are parallel to the long edge of the document. These and other prior art devices appear to lack flexibility in that, at least insofar as they expressly describe it, successive scan lines, in the portrait mode, progress from left to right across the document. In the landscape mode, successive scan lines progress from the document top to the document bottom. There are circumstances in which additional degrees of flexibility are desired.

For example, and in connection with portrait mode printing, the scan lines described in the prior art are parallel to the long length of the document. However, the direction of the scan line (top to bottom or vice versa), and the direction in which scan lines progress are not necessarily fixed. There are at least eight different cases, in portrait mode printing, that can be defined (in four cases the scan lines are in the direction of the long dimension of the paper, and in four other cases the scan lines are in the direction of the short dimension of the paper). Regardless of the relationship between scan lines and the paper orientation, successive scan lines may progress either left to right or right to left. In addition, for left to right progression, the scan line itself can be directed either from top to bottom or bottom to top of the document. Similarly, for scan line progression from right to left, the scan line can extend either from top to bottom or bottom to top.

The same eight cases exist for landscape mode printing. Thus there are eight different possible combinations of scan line direction relative to symbol rows on the document, and the progression of successive scan lines relative to symbol row direction. These can be itemized as follows for convenience:

In one case the scan line is directed perpendicular to the symbol rows of the document, and is directed from the bottom of the document to the top, in this case successive scan lines progress from left to right.

In another case the only change is that the scan line is directed from top to bottom of the document.

In still another case the scan line is also directed perpendicular to the symbol rows, from bottom to top of the document, but the successive scan lines progress right to left.

In still another arrangement, the scan line is also directed perpendicular to the symbol rows, and is directed from the top of the document to the bottom, successive scan lines progress from right to left.

Alternatively, the scan direction is parallel to the symbol rows. In a first such case, the scan line runs left to right and successive scan lines progress top to bottom.

In another arrangement, the scan line is directed right to left and successive scan lines progress top to bottom.

Still another arrangement has scan lines directed left to right and successive scan lines progressing bottom to top.

Finally, the last arrangement has scan lines directed right to left, successive scan lines progressing from bottom to top.

Prior art electrophotographic printers are divided into all points addressable (APA) and base line printers. Because of the flexibility of APA printers, there is often little constraint on the size or placement of symbols or graphics and as would be expected the flexibility renders these machines complex. Base line machines must reference all symbols or graphics to one of a number of conceptual, parallel base lines. Typically the font (or symbol definition) for base line machines includes symbols or graphics of a fixed size, usually at least the height of the font (the dimension perpendicular to the base line) is equal for all symbols. By reason of this constraint, the architecture of baseline machines is usually less complex.

SUMMARY OF THE INVENTION

The present invention is directed at a base line machine with increased flexibility in that while all symbols and graphics are referenced to one of a number of base lines, there is no constraint on the size of the font. The lack of a constraint on a font dimension is coupled with a limitation on the size of any symbol actually being printed, this limitation is implemented by "cutting off" the symbol but only to the extent it would otherwise intrude into the region dedicated to another base line. The invention, while a base line machine places no constraint on the distances between adjacent base lines, in other words the spacing of adjacent base lines is independently variable (so long as that distance exceeds some minimum separation). The flexibility achieved is enhanced by providing for magnification of the font, independently, in two dimensions on a page basis. In other words each symbol on a page can be printed of dimensions $aF_x$ by $bF_y$, where $F_x$ and $F_y$ is the dimension of the font, as stored, and a and b are independently variable. In an embodiment which has been constructed, a could be selected as 1, 2 or 4 and b could be selected as 1, 2 or 4, independent of the selection for a.

Typically the electrophotographic printer is arranged to reproduce a plurality of characters or graphics (hereinafter generically called symbols). In many cases these symbols are arranged in rows (for example a typical line of alphanumerics in a document). Even in cases of documents which are wholly or partly graphic in character, the different graphics can be decomposed into a relatively simple library of components ordered along parallel rows. Thus a first requirement for such an electrophotographic printer is a "library" of the different symbols. In the remaining portions of this specification the "library" will be referred to as a font or a font memory. Thus the font has at least a single entry for each different symbol, and such entry consists of or includes a bit map (or other encoded version of the bit map) of the associated symbol. Each scan of the document may intersect one or more symbols, the particular symbols intersected by a particular scan depend upon how far through the document the scan is located and where the various symbols lie in the document. Depending on the print case, each symbol intersecting a given scan line may be from a different row or each symbol intersecting a given scan line may be from a single row. In either case, the bit map of each symbol is located on a plurality of scan lines. Thus the electrophotographic printer must, dependent on the case being printed, identify each symbol, a portion of which appears on the scan line, so that the bit map of each symbol can be located. In addition, the portion of the symbol corresponding to the selected scan line must be identified, and then the associated portion of the bit map of each symbol must be located along the scan line in the proper relationship relative to the portions of other symbol bit maps and the boundaries of the document. Typically, portrait and landscape mode printing view a given symbol from orthogonal directions. That is, typically in portrait mode printing the scan line is parallel to the long dimension of the H whereas in landscape mode printing the scan line is perpendicular to the long dimension of the H. For the sake of definiteness in the application we will refer to "normal" and "rotated" print cases. In normal print cases the scan line is parallel to the long dimension of an H character, for example, and in rotated print cases the scan line is perpendicular thereto. In some electrophotographic printers there is a single bit map for each different symbol. The bit map is addressed and/or the bit map is processed so as to selectively produce a bit sequence as stored in the bit map or a bit sequence as rotated by at least 90°, depending on whether landscape or portrait mode printing is being effected. In accordance with an embodiment of the invention to be described hereinafter, each symbol has two entries in the font. One entry is used for normal printing and the other entry is used for rotated printing. Those skilled in the art will readily understand that these two entries in the font are typically identical except that one is rotated 90° with respect to the other. In the special case of a printer whose print element is asymmetrical (a rectangle vs. a square or a circle) the fonts may have differences beyond the mere rotation.

For clarity several terms should be defined:

Scan Line: The individual lines along which symbol bit maps are reproduced by switching on/off of a binary data signal. Scan lines for normal printing are perpendicular to the base line, for rotated printing the scan line is parallel to the base line.

Base Line: A selected one of the scan lines in rotated printing to which symbol bit maps are referenced, in normal printing the base line is a conceptual line, perpendicular to the scan line, to which symbol location is referenced.

Symbol: A convenient unit representation, a plurality of which describe a document. Alpha-numeric characters and punctuation graphics may be symbols, other larger graphics may consist of a plurality of smaller symbols.

Row or Symbol Row: The linear arrangement of symbols e.g. characters or punctuation graphics in an image or document.

The implementation of a baseline character generator in order to effect the printing of any particular document requires three different types of information, over and above the bit maps of each of the different symbols provided by the font. The first type of information is a representation of the symbols appearing in the document to be printed and the order or placement (either explicit or implicit), in which they appear. That is, more particularly, this information in the case of an alphanumeric document identifies, in sequence, each alphanumeric character along with any associated spaces and punctuation graphics, etc. This information is of course document specific, that is it is different for each different document to be printed. The second set of information required, which is also document specific, is a Column Position Escapement (CPE) table. (The term escapement is borrowed from the typewriter field where it refers to the width of a character.) This table includes an entry for each different symbol row of the document. Each entry includes three portions, the first portion identifies the first symbol on the row. This identification is actually an address of the memory location in that memory storing the first type of information to identify the specific symbol which is in the first position on that row. The second portion of the information in the CPE table is the escapement value for that character (the distance in some consistent measure used to print the character). The third and last portion of the information in the CPE table for each symbol row is the height in the document allocated to the particular row.

The character generator also includes font specific (as opposed to document specific) information. The font specific information is provided in two forms. An address escapement table has two entries for each symbol, one for normal and the other for rotated symbols. Each such entry includes three components. A first component is a pointer to the second table (discussed below). The other two components define the size of the symbol in orthogonal directions, that is parallel and perpendicular to the scan direction. Thus for example a character which is in normal mode allotted a space four units in the scan direction by three units perpendicular thereto, would be allocated, in the rotated mode, three units in the scan direction and four units perpendicular thereto. The second form of font specific information is the bit map table or font. The bit map table includes two entries for each symbol, one for normal mode, the other for rotated mode. Each bit map is located at an address corresponding to the pointer contained in the address escapement table. Alternatively, the address escapement table and bit map table can be considered to each have a single entry for each symbol, with some symbols bearing a rotational relationship with other symbols.

The character generator in accordance with the invention includes seven major components. Two of these components comprise the page buffer (which stores the data representing the first type of information referred to above) and the column position escapement (CPE) memory. These areas are loaded with document specific information. Two additional major components are the address escapement table and the font memory.

The fifth major component is the scan assembly logic (SAL). This logic, when supplied with a print command (identifying the particular case in which the document specific information is to be reproduced), first accesses the CPE table in dependence on the particular case. Information from the CPE table (specifically the page buffer address) is used to access the page buffer. Information in the page buffer identifies a particular location in the address escapement table. This is accessed to identify a specific location in the font table. The scan assembly logic, based on this information, begins extracting a bit sequence from the font table, and as the bit sequence is being extracted (bit maps of different symbols) the CPE table is modified, different locations in the page buffer are addressed directing read out from different locations in the address escapement table and correspondingly different portions of bit maps from the font table. Data extracted from the font table is fed serially to the sixth major component, the aligner, where modifications are made to the bit sequence. These modifications may add underscore representations (if necessary), add blank space between adjacent symbols on adjacent symbol rows, and limit the bit map data employed, if necessary. The output of the aligner is a bit sequence consisting of portions of bit sequences from the font table interspersed with blank portions and underscore bits. This composite sequence is fed to a scan buffer (the seventh component) where it is stored in a serial fashion. The scan buffer is then read out (also in dependence on the particular case being printed) in normal or reverse order to produce a bit sequence to drive the printer. The manner in which the scan buffer is read is also controlled to provide for the selected magnification.

Through conjoint action of the CPE table, page buffer and address escape table, a font reference address (FRA) is generated; this identifies a particular symbol to be printed by the fact that the FRA is the reference address for a particular symbol. The SAL will access the font either at the FRA or an offset (FRA+ESC−1) from the FRA depending on the print case. Typically a single access will be inadequate to produce sufficient data, even for the single scan, so the SAL generates additional addresses to the font. Each additional address is of the form FAF+nESC (where FAF is the original access, and n is incremented from 1 for the second access, by 1 for each subsequent access). The quantity of data extracted is continually compared to both the character size and the line height. If the quantity of data extracted equals or exceeds line height, the excess data is discarded and the next symbol is accessed. If the quantity of the data exceeds the character size (but not line height), the excess data is disregarded and fill bits are generated up to the line height. Thereafter, the next symbol is accessed.

In normal printing each different symbol is on a different symbol row, so the CPE pointer is incremented to reach the next symbol. In rotated printing the page buffer pointer is incremented, but not the CPE pointer.

When a scan for a symbol is completed the CPE entry reflecting the escape field is rewritten to reflect the remaining, unscanned portion of the symbol. When, after successive scans the escape field has been decremented to indicate the symbol has been completely scanned, the page buffer pointer is incremented or decremented depending on the print case. In normal printing the page buffer pointer, as modified, is rewritten to the CPE table. In normal printing the CPE pointer is reset after each scan. In rotated printing the CPE pointer is incremented when the line height for a symbol row has been completely scanned.

Although there are eight different cases which can be uniquely identified, the scan assembly logic only handles four cases. For each of the four cases handled by the scan assembly logic, the scan buffer can be read in either of two directions (one of these directions is identical to the direction in which the scan buffer was written, the other direction is just the reverse order), thus multiplying the number of different print cases by two to produce the capability of eight different print cases.

Of the four different cases handled by the scan assembly logic, there are two cases for each of the different fonts (and there are two fonts, one rotated 90° with respect to the other). The two different cases (for each of the two different fonts) differ in that the scan may begin either at one extreme or the other of the font, and depending on whether the scan begins at the "top" or the "bottom", the scan progresses either "down" or "up". Accordingly, when addressing the font memory, the address at which a particular symbol is initially accessed depends on the print case, and the manner in which the address is altered to retrieve subsequent portions of the font also depends on the print case.

As indicated above, the font can be magnified (referred to as a presentation font) independently in two dimensions. The magnification is handled on a page basis (that is, all the characters on a page will be magnified to the same extent). Magnification of the font in a direction perpendicular to the scan direction is handled as follows. Normally, the binary bit stream comprising the data for a given scan is input to a scan buffer, and the scan buffer is read out to drive the printer (for example to modulate a laser beam). To magnify the font in the direction perpendicular to the scan direction, once the scan buffer has been written, it is read out more than once before it is rewritten. For example to double the size of the font perpendicular to the scan direction, the scan buffer is written and then read twice before being rewritten with data for a different scan. To magnify the font by a factor of four, once written the scan buffer is read out four times in succession before it is again rewritten.

Magnification of the font in a direction parallel to the scan direction is handled in a different fashion. In those cases where the font is not to be magnified in the direction of the scan, each bit in the scan buffer determines the condition of a given number of pels in the record; that given number may be unity, two, etc. When the font is to be magnified by a factor of two in a direction parallel to the scan direction, each bit in the scan buffer controls twice the number of pels that it would have controlled in the unity magnification case. Likewise, to magnify the font in the direction parallel to the scan direction by a factor of four, each bit in the scan buffer is used to control four times the given number of pels.

BRIEF DESCRIPTION OF THE DRAWINGS

The present invention will now be described in further detail in the following portions of the specification when taken in conjunction with the attached drawings in which like reference characters identify corresponding apparatus and in which:

FIG. 1A is a block diagram illustrating how the character generator 100 of the present invention is employed in practice;

FIG. 1 is a block diagram of the character generator 100;

FIG. 2 is a block diagram corresponding to FIG. 1B, but in more detail;

FIGS. 3A-3C illustrate a typical entry in the font memory for a typical character, wherein FIG. 3A illustrates how the dot pattern of the character is broken down into slices, FIG. 3B illustrates how the various words correspond to the showing of FIG. 3A and FIG. 3C illustrates how those words identified in FIG. 3B are actually stored in the memory;

FIG. 4 is a block diagram of the address structure for the CPE table.

FIGS. 5C and 5D illustrate "normal" processing; while FIGS. 5E and 5F show "rotated" processing;

FIGS. 6 and 7 illustrate typical contents of the column position escapement table and page buffer, respectively;

FIG. 9 is a detailed block diagram of a portion of the scan assembly logic;

FIG. 10 is a table illustrating how the components of FIG. 9 operate in various modes;

FIG. 11 is a timing diagram relative to FIG. 9;

FIGS. 12A and 12B (when placed together such that FIG. 12B is to the right of FIG. 12A) and FIGS. 13A and 13B (when placed together such that FIG. 13B is to the right of FIG. 13A) comprise a more detailed block diagram of the remaining components of the scan assembly logic.

FIGS. 14-21 shows the eight print cases implemented by the invention and the relationships between these print cases.

FIGS. 22 and 23A, 23B, 23C1, 23C2, 23D1, and 23D2 show the scan buffer 130 and associated circuits.

DETAILED DESCRIPTION OF A PREFERRED EMBODIMENT

Figure 3B:
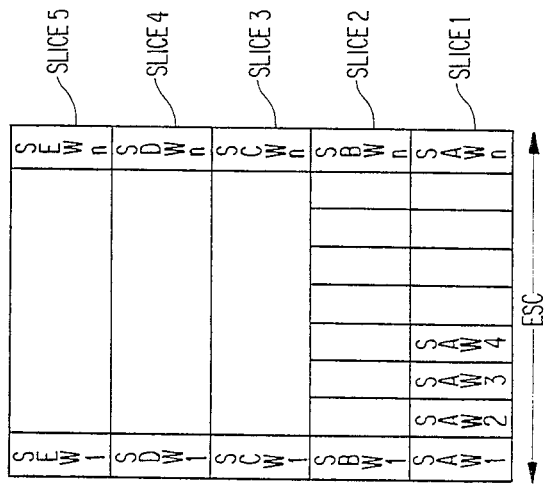

FIG. 1A illustrates the manner in which the inventive apparatus and method is employed. More particularly, the inventive character generator 100 can provide a serial, binary stream to a printer 200 or other image forming device. In the event a printer 200 is employed, the printer outputs a physical record such as the document 300. The printer 200 can be any printer which is driven by a binary signal stream to produce a printed record. In an embodiment actually constructed, the printer 200 used a laser beam to write an image on an electro-photographic drum which image was transferred to a record using xerographic techniques. One such printer is shown in Schomburg U.S. Pat. No. 4,000,486, FIG. 1. As indicated above, the character generator 100 requires both document specific and font specific information, all of which is provided by the processor 400. Typically the font specific information will be permanent or semi-permanent, whereas the document specific information may be provided by external apparatus such as the terminal 500, either coupled directly to the processor 400, or coupled thereto indirectly such as by a communication link.

FIG. 1B shows a block diagram of the character generator 100. More particularly, the character generator 100 includes a print command register 105, scan assembly logic 110 and an aligner 120. The output of the aligner 120 is coupled to a scan buffer 130. The output of the scan buffer is the serial binary stream that is employed by the printer 200, or other image forming device, to produce the desired image. The scan assembly logic 110 accesses a plurality of tables located in memory. These include the font memory 140 (containing font specific information) and the address/escapement table contained in the address/escapement memory 150. The address/escapement table in turn cooperates with the page buffer 160. The address/escapement table also contains font specific information whereas the page buffer 160 contains document specific information. Furthermore, the scan assembly logic 110 cooperates with a column position escapement table contained in a column position escapement memory 170. Both the column position escapement memory 170 and the page buffer 160 are written by the processor 400, as is indicated by the solid line leading to both elements labelled "from processor". The font memory 140 and address escapement memory 150 (containing font specific information) may be permanent (such as ROM) or semi-permanent, and in the latter event these memories may also be written from the processor 400.

Whereas the contents of the page buffer 160, address/escapement memory 170 and font memory 140 remain unchanged in the course of producing an image, the column position escapement memory 170 may be altered or modified, after it has been written from the processor 400, in the course of image presentation. This latter feature is illustrated by the line 171 by which the scan assembly logic 110 can write to the column position escapement memory 170.

FIGS. 14-21 illustrate the eight different print cases, one figure per print case. Each figure shows a typical document, and to designate whether the case is "normal" or "rotated" each figure also shows a plurality of symbol rows SR; a review of FIGS. 14-21 indicates that the relationship between the scan direction (SD1 or SD2) and the symbol rows SR shows that in the "normal" mode (FIGS. 14-17) the two directions are perpendicular whereas in the "rotated" mode (FIGS. 18-21) the two directions are parallel.

A first print case is shown by FIG. 14. In this print case, the scan direction SD1 can be considered from bottom to top, and the scan progression (SP1) can be considered left to right. The second print case (FIG. 15) differs from the first print case in that the scan progression (SP2) is right to left. A third print case, shown in FIG. 16, differs from the print case of FIG. 14 in that the scan direction is reversed, e.g. SD2 is top to bottom (the reverse of FIG. 14). Finally, a fourth print case is shown in FIG. 17; FIG. 17 is similar to FIG. 15 except for the reversal of the scan direction, again in FIG. 17 the scan direction (SD2) is from top to bottom whereas in FIG. 15 it is from bottom to top.

As will be described below, the character generator of the invention changes its addressing mode when going from the print case of FIG. 14 to the print case of FIG. 15 and the CPE tables for the print cases of FIGS. 14 and 15 are different. As will also be described below, the character generator produces a binary signal stream which can be used to operate the print element (such as to modulate a laser beam). Just prior to employing the binary signal stream to modulate the print element, the signal stream is input to a scan buffer; and it is written into the scan buffer in a fixed order. For the print cases shown in FIGS. 14 and 15 the scan buffer may be read out in the same order as the order in which it was written. To handle the print cases of FIGS. 16 and 17 (reversing the scan direction) the direction in which the scan buffer is read is reversed, so that it is read out in reverse to the order in which it was written. Accordingly, the character generator (up to the point of reading the scan buffer) operates identically for the print case of FIG. 16 as compared to the print case of FIG. 14, and when the print case of FIG. 16 is being implemented, the direction of reading the scan buffer is reversed. It will also be appreciated that the same relationship holds for the print cases of FIGS. 15 and 17, e.g. the only difference being that for the print case of FIG. 17 the scan buffer is read in an order reverse to the order in which it is written.

A fifth print case is shown in FIG. 18; the print cases shown in FIGS. 18–21 are considered "rotated" since the scan direction (SD1 or SD2) is parallel to the symbol rows SR. The difference between the print cases of FIGS. 18 and 19 is that the scan progression (SP2) in FIG. 19 is reverse to the scan progression (SP1) of FIG. 18. The only difference between the print case of FIG. 20 and that of FIG. 18 is that the scan directions are opposite. The relationship between the print cases of FIGS. 18 and 20 is the same as the relationship between the print cases of FIGS. 14 and 16, e.g. the scan buffer for the print cases of FIGS. 16 and 20 is read in an order reverse to the order in which it is written, whereas in the print cases of FIGS. 14 and 18 the scan buffer may be read in same order as the order in which it was written. As was the case for the print cases of FIGS. 15 and 17, the only difference between the print cases of FIGS. 19 and 21 is that again the direction in which the scan buffer is read is reversed for FIG. 21 as compared to the direction in which it is read for FIG. 19.

A particular advantage of the inventive character generator is that it can be used with a printer regardless of the printer requirements. That is, some printers are restricted to a specified one or a limited few sets of scan direction, progression and relation to symbols rows. As should be apparent, this character generator can be used with any combination of these factors.

FIG. 2 is an exploded view of FIG. 1B showing the cooperation between the column position escapement memory 170, page buffer 160 and address escapement memory 150 with the scan assembly logic (SAL) 110.

More particularly, and as shown in FIG. 2, the column position escapement memory 170 storing the column position escapement table includes three pieces of data for each symbol row. As initially loaded by the processor 400, the column position escapement table includes a page buffer pointer or address (UCP15-0) to identify the address in the page buffer 160 representing an initial character in an associated symbol row. As printing proceeds, the address is altered to successively address different symbols. In normal printing, the altered address is rewritten to the CPE table, in rotated printing the altered address is not rewritten, for reasons which are described below. The column position escapement table also provides an escapement value (UCE58-51), as written by processor 400—this is a null value, but as printing is effected this field is initialized and then is decremented. The column position escapement table also provides a line height (ULH08-01). The page buffer address or pointer identifies that location in the page buffer 160, the contents of which identify the first symbol on the associated row. Which symbol is first depends, of course, on the direction of scan progression; accordingly the contents of the CPE are different for different print cases (for the same document). The escapement value after initialization identifies the current escapement associated with the particular symbol, e.g. the current escapement defines that portion of the symbol that has not yet been scanned. In normal printing the escapement is measured parallel to the symbol row, for rotated printing the measure is perpendicular to the symbol row. The line height identifies the distance between the base line associated with the row and the next base line, or in the case of the first line, the portion of the document or image which is associated with the base line.

The page buffer 160 includes three pieces of information for each symbol including a representation of the existence and type of underscores, and a combination of font and code bits to identify the symbol, this combination may be referred to as an a/e pointer. As will become apparent, different underscore codes produce either one or two underscores, which are selectively located.

The font and code information is used in combination as a pointer to address the address escapement memory 150. The A/E memory 150 stores three pieces of information with respect to each symbol. The address escapement memory 150 stores a font reference address (FRA) and information indicating the character size, both perpendicular to (PERP) and parallel to (PAR) the scan direction.

FIG. 2 illustrates the scan assembly logic (SAL) broken into its five components including SAL 111, SAL 112, SAL 113, SAL 114 and SAL 115.

As shown in FIG. 2, when the page buffer pointer (UCP15-0) is read, that pointer is input to SAL 111, the output of which allows the pointer to be rewritten into the column position escapement table. During the course of writing any particular row for normal print cases, at selected times, the page buffer pointer rewritten into the column position escapement table is not the same as the one read from the memory. As indicated above, the processor 400 provides for writing the column position escapement table which initially has the page buffer pointer of the first symbol on the row (which symbol is "first" depends on the print case). As the row is being written, however, the column position escapement table is altered so that the page buffer pointer read from the column position escapement table identifies the symbol being written. Likewise, the column position escapement table, as originally written by the processor 400, included a null escapement value for the first symbol. This value is initialized and then is incrementally altered. Symbol escapement is one input to the SAL 113, the other input to which is derived from the particular size of the font symbol being written. SAL 113 will rewrite a current escapement by incrementally altering the UCE output by CPE 170 on different scans. This allows the column position escapement table to output the current escapement value, in the course of writing the symbol. When the page buffer pointer is altered, the current column position escapement table escapement value may also be altered so as to indicate the escapement for the next symbol. For rotated print cases the escapement is altered, but the page buffer pointer is not rewritten.

The output of the page buffer 160 is used as a pointer to the address escapement memory 150. One output of the address escapement memory 150, the FRA, is an input to the SAL element 114. SAL 114 also receives an input corresponding to the current line height (ULH08-01) as well as the current escapement value (UCE58-51). This is used together with the size value for the symbol to address the font memory 140. In this fashion not only is the initial access for a symbol determined, but as the symbol is being written, subsequent accesses are also addressed by the SAL 114.

The output of the font memory 140 is applied to the aligner 120, along with the output of SAL 115. One input to SAL 115 is the existence and type of underscore, read from the page buffer 160. The other input to the SAL 115 is an indication of the relative size of the symbol to the line height. This allows the aligner 120 to "fill" that portion of the line height which is not occupied by the symbol or, alternatively, to cut off any symbol which would extend beyond the line height.

Before further describing the apparatus or its method of operation, the organization of the font memory 140 will be explained. The font memory 140 may contain a dot pattern for every character or symbol that can be printed. In the embodiment to be described, this font information is in raw or uncoded form. It should be apparent that the same information could also be stored in encoded form, within the spirit and scope of the invention. The memory is binary in nature and thus one of the two binary signals which is stored causes a black dot to be printed, whereas the other does not. In an embodiment actually constructed, the memory 140 is capable of addressing and reading a word of 32 bits. The 32-bit length characterizes one dimension of a slice, representing a component of a symbol. The other dimension of the slice is the number of scans required to completely read out the symbol. In the course of reading the bit pattern corresponding to a particular character or symbol, a single scan may be made up of several slices, and the aligner 120 (which is fed from the font memory 140) may use some or all of the data read from the font memory. As will also be described, the symbol printed as a result of reading the font memory 140 may actually, when printed, take on a variety of sizes, e.g. the printed symbol may be magnified as compared to the symbol as stored. In an embodiment of the invention which has actually been constructed, the magnification can be by factors of two or four, and the magnification can be applied independently in either direction although one magnification selection (independent in the two directions) is effective for an entire page.

Figure 3D:
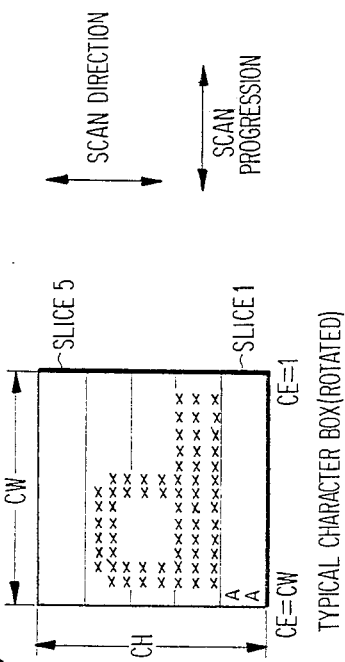
FIG. 3D corresponds to FIG. 3A but shows how the character is stored in "rotated" form.
Figure 3A:
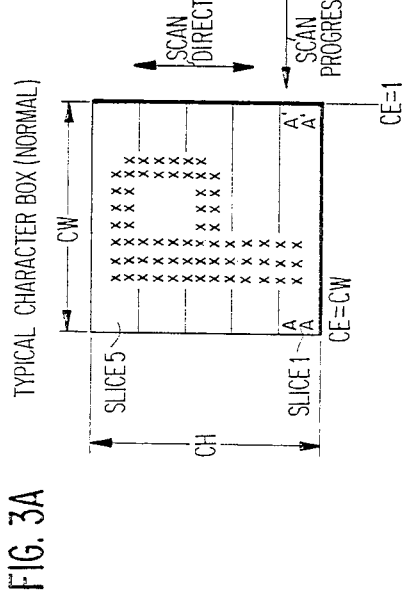
Figure 3C:
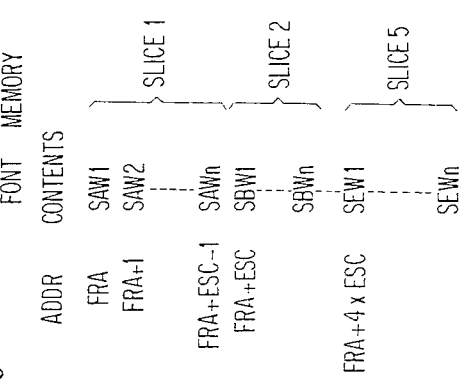

FIG. 3A shows a schematic representation of the data which may be stored for a single character "P" in the font memory 140. The cross-hatched region of FIG. 3A shows the location at which dots will be printed. FIG. 3A shows that this character consists of five slices, oriented perpendicular to the scan direction and parallel to the scan progression. The characters AA identify the font reference address (FRA), an address location for a reference word for a reference slice, each other word (for the reference and other slices) is referenced to the FRA. As has been explained, the font memory 140 actually includes a number of 32-bit words for each entry, and FIG. 3B has identified a number of those words for purposes of description. The relative location of the different words identified in FIG. 3B correspond to their location relative to the symbol of FIG. 3A. Each of the words is identified by an alpha-numeric SXWY, wherein the character X can take on values for the different slices, for example A-E (corresponding to slices 1-5) and the character Y can take on values $1-n$, representative of n words per slice. The memory 140 itself is organized as shown in FIG. 3C. FIG. 3C shows a table with two columns, the first column identifying the address (ADDR) and the second column identifying the contents of the memory at that location; the data stored in the memory 140 corresponds to the second column. Thus as shown in FIG. 3C at the location FRA we find the 32-bit word SAW1. The next memory location (FRA+1) includes the 32-bit word SAW2. The width of a character, in scans, is related to its escapement or ESC. Thus at memory address FRA+ESC, we find the first word SBW1 in slice 2, and at FRA+4-*ESC we find the first word SEW1 of slice 5. The use of 32-bit words is of course exemplary. The number of slices used to define a character or symbol depends on the size of the character or symbol and the number of bits per slice.

From the foregoing it should be apparent that for the case when the scan progresses left to right, we begin reading the font memory 140 at FRA, and, in a first scan, read each word (SAW1, SBW1, ... SEW1) in that "column". On the next scan of this symbol we may read the adjacent words in a parallel column SAW2, SBW2, etc. As will be described, the current value of escapement can be used, along with FRA and the particular print case to locate the current "column" to be read on any scan.

In the case where the scan progression is right to left, rather then addressing the font at FRA, we address it at FRA+ESC−1 to read SAWn. Thereafter, continuing in a first scan we read each other word in that column, e.g. SBWn, SCWn, etc. In the next scan we may read in the adjacent word in the parallel column, e.g. SAWn−1, SBWn−1, etc. These are the only two cases handled by the "normal" font of FIG. 3A, i.e. the font addressing provides for one scan direction (SAW1-SBW1-SCW1-etc.).

To handle "rotated" characters, we use a different font, such as the one shown in FIG. 3D. Here the scan assembly logic also has two different cases. For left to right, or more descriptively, top to bottom, we can read the font beginning with the column in which the FRA lies (AA); in that case we read SAW1, SBW1, etc. The next scan we read SAW2, SBW2, SCW2, etc. For the other case we can begin at the opposite extreme of the font (FRA+ESC−1) by reading SAWn, SBWn, SCWn, etc. On the next scan we read SAWn−1, SBWn−1, etc. This gives us the same total of two oases as did the "normal" font.

Figures 5A, 5B:
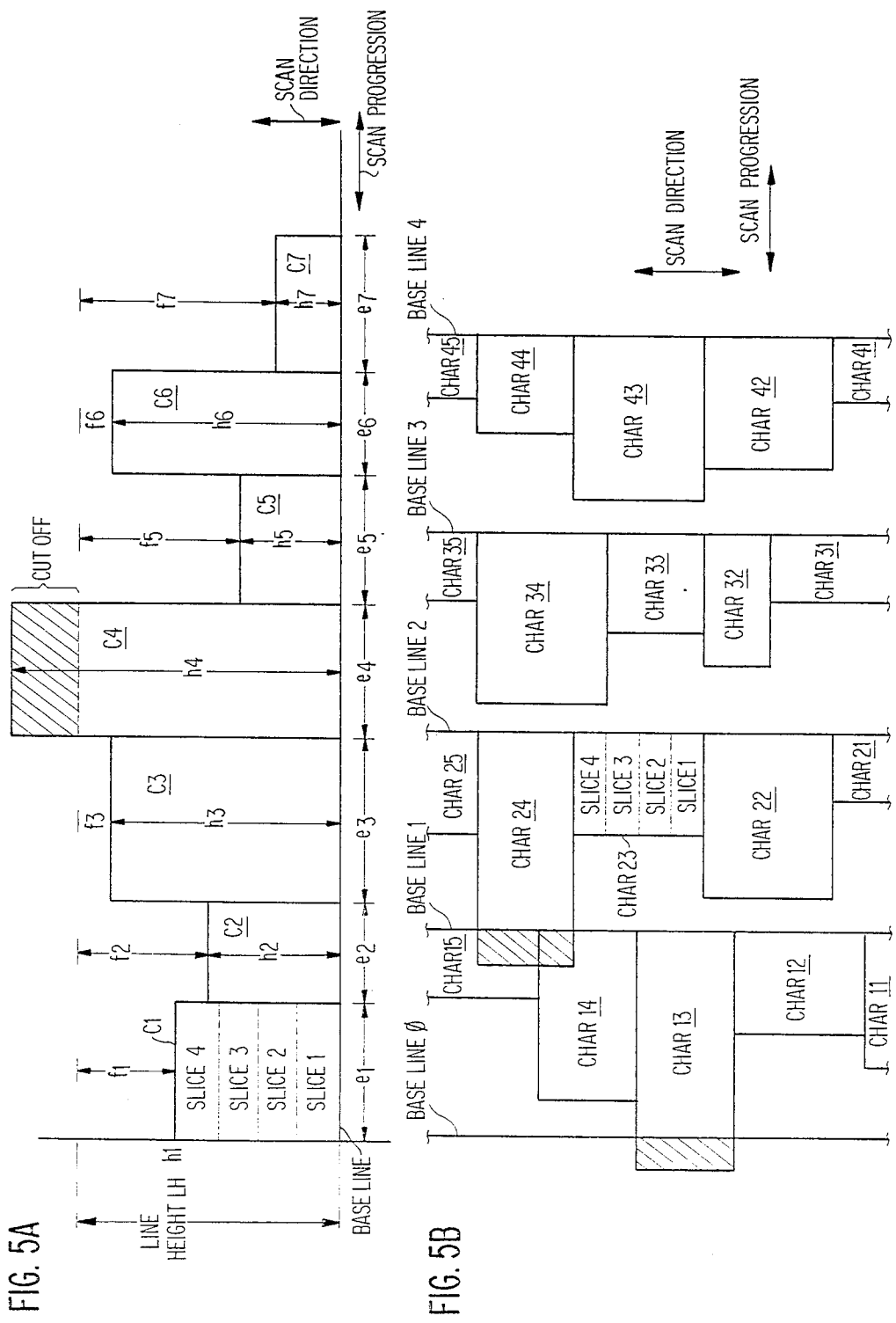
FIGS. 5A and 5B show exemplary character boxes relative to a base line or base lines for normal and rotated cases, respectively.

In making up a document we must access the fonts for those symbols which lie on a common scan, in the order in which the scan crosses the symbols. As the scan progresses, we must access the appropriate symbols in turn. FIG. 5A shows a plurality of symbol or character boxes Cl-C7 located on a typical base line. As shown in FIG. 5A each character box may have a unique escapement $e_1$ and a unique height $h_1$, although that is not of course essential. FIG. 5A also shows the line height LH for the typical base line which is illustrated. In the case of character box Cl, FIG. 5A shows the four slices which make up that character and also indicate that there is a blank or white space (of length $f_1$) between the extent of the character box Cl and the line height LH. As will be explained, in the course of scanning character box Cl, the character generator will, after the scan of character box C1 is complete, fill with blank space for the distance $f_1$ up to the line height LH. It will also be apparent, therefore, that character boxes of different heights will necessarily require different fill space. In the case of character box C4, FIG. 5A shows that the character height $h_4$ is greater than the line height LH. As will be described, the character generator will scan through that portion of the character box C4 corresponding to line height LH and then cut off the excess portion of the character box C4. That is, the bit pattern containing the font memory 140 corresponding to the hatched region in FIG. 5A will not be passed onto the aligner 120.

FIG. 5B is similar to FIG. 5A except that it shows a plurality of typical base lines 1-4 for a rotated page, that is where the scan direction is parallel to the base line. It should be apparent from FIG. 5B why the page buffer pointer is rewritten to the CPE for normal printing and why that is not necessary for "rotated" printing. In normal printing (FIG. 5A) a single scan crosses plural symbol rows; to identify where the scan is within the symbol row, the page buffer pointer is updated to keep track of the scan within each symbol row. The updated pointer must be rewritten to be CPE table since, in normal printing we will operate on other symbol rows before returning to a specified row, and data from the CPE table will be extracted to keep track of our location. For rotated printing a scan lies within one symbol row; within the row we can increment the page buffer pointer but we do not need to rewrite the PB pointer in the CPE table although we do rewrite the escape field since we will complete printing of one symbol row before going on to the next.

FIGS. 5C and 5D relate to the interaction of the column position escapement table, and the different outputs provided by it during the course of creating a document. FIG. 5C shows two typical base lines B1 and B2, characters C51-C59 are shown on base B1 whereas characters C61-C69 lie on base line B2. FIG. 5C specifically illustrates that the escapement for each of the characters is variable and there is no requirement that the escapement for a character on one base line match up or be consistent with the escapement for a character on the other base line. FIG. 5C also shows eight sequential scans S1-S8 intersecting the base lines B1 and B2. The scans S1-S8 are representative of a much larger number of scans that would actually be employed. Note for example that character C51 intersects scans S1-S3 whereas character C61 only intersects scans S1 and S2.

Since the scans are oriented perpendicular to the base line, FIG. 5C illustrates what is referred to as "normal" as opposed to "rotated" operation. Although each of the scans will intersect all the base lines in a document, FIG. 5D has been provided to represent the output of the column position escapement table at different times in the course of the scan. For each of the different times (identified by the different columns in FIG. 5D) the output of the column position escapement table at PBA (page buffer address), UCE (character escapement) and ULH (line height) are identified, each in a separate row.

Note that the ULH output is either B2LH (the height of B2) or B1LH (the height of B1), depending upon which base line the scan is within. For the period of time that the scan lies within the region of base line B2, the PBA output identifies the appropriate character in base line B2, and similarly, when the scan lies within the region of base line B1, the PBA output identifies the page buffer address of the associated character lying on base line B1.

Thus as the scan S1 progresses into the region of base line B2, the PBA output corresponds to the character C61, as the scan leaves the region of base line B2 and enters the region of base line B1, the PBA output switches to that of C51. The same operation is true for the scan S2. This effect is achieved by addressing different entries in the CPE table. Note, however, when we reach scan S3 the PBA output when the scan is within the region of base line B2 is C62 (not C61 which previously had been the output), the reason for this will be described below. Likewise, in scan S4 the PBA output for the region of B1 is now C52 as opposed to the initial C51.

Referring now to the UCE row, note that in the initial scan for the character C61 the escapement value is identified as C61E, which corresponds to the escapement for the character C61. The CPE table is written with a null field for escapement. The escapement field is initialized during the first scan of a symbol. However, in scan S2, the UCE value is $C61E_m$, the subscript m identifies this value as having been modified from its original value C61E. The same is true when the scan S2 lies in the region of the base line B1, the UCE output is $C51E_m$, whereas the escapement value for the character C51 was originally C51E.

More particularly, and referring also to FIG. 2, the CPE table stores a field for each base line, the fields are identified in FIG. 2. For example for base line B1 the CPE entry is respectively C51 (the page buffer address of the character C51), C51E (the escapement value for this character) and B1LH (the line height for this base line). By referring to the UCE row of FIG. 5D, in the column S2/B1, it is apparent that the UCE entry for the character has been modified. That modified entry is calculated by the SAL 113 and rewritten into the CPE memory 170, as will be described below. Normally, the page buffer address is rewritten in unmodified form. However, when a number of scans required to complete escape through the character has been accomplished, the modified escapement value will indicate that fact (in an embodiment to be described, that indication is given when the modified escapement value has been decremented to unity). At that point, the page buffer address is modified, and that is how the PBA changes from its original C61 (for the base line B2) to C62 (see column S3/B2).

In the case where the scans progress from left to right (that is where scan S1 precedes in time scan S2) we must increment the PBA when we have escaped through a character. However, when the scans progress right to left, we must decrement the PBA by unity when we have escaped through a character.

FIGS. 5E and 5F are similar to FIGS. 5C and 5D except that they illustrate operation in the "rotated" condition. FIG. 5E shows base lines B3 and B4, base line B3 being associated with characters C71-C79 and base line B4 being associated with characters C81-C89. For the "rotated" case, each of the scans is now parallel to the base line (as opposed to what is shown in FIG. 5C).

FIG. 5E shows that scans S10-S13 occupy the region of base line B3 whereas the other scans (S14-S17) lie within the region of base line B4.

In order for the character generator to operate properly, as scan S12, for example, progresses from character C79 to C78, the page buffer address must change. This is monitored by comparing the quantity CH (from the A/E memory 150) with the extent of the scan progression.

FIGS. 6 and 7 show respectively the contents of the CPE memory 170 and the page buffer (PB) memory 160. As previously indicated, the column position escapement memory has three fields, in a first field there is a page buffer address or pointer (PBA). The CPE is formatted so that the PBA identifies the location in the page buffer corresponding to the first character on a line in accordance with the particular scan progression, e.g. in a left to right progression it is the left-most character on the line whereas in a right to left progression it is the right-most character. The second field of the CPE is the UCE (escapement) entry. This field is initialized to zero, and as will be described, the first time a particular character is scanned, the character escapement is read from the address/escapement memory and written into the CPE. Each time the character is scanned, the UCE entry is decremented. When a character has been completely scanned (by having the UCE value decremented to unity) then the page buffer address in the CPE memory is incremented/decremented so as to prepare for scanning the next character on that line. The last field of the CPE, ULH, identifies the line height (the height of a symbol row) and thus the line height can be different for each different line (symbol row).

FIG. 7 shows the contents (as well as the addressing) of a typical page buffer. The contents of the page buffer are identified as three different components, e.g. US (underscore), font and code. Actually, the font and code will be combined to address the address escapement memory, therefore these two sections will be treated as a combined address or pointer entry. By comparing the addresses for the page buffer memory with the contents of the CPE memory, we can identify a first line as extending from page buffer addresses PBA 1-22, a second line extending from PBA 23-45 and a third line extending from PBA 46-69, etc.

SUMMARY OF ADDRESSING

Referring again to FIG. 5A, the manner in which the font addressing is handled will now be described. First we take up a normal case, with the scans progressing left to right. For the first symbol row to be printed, the CPE memory 170 outputs the three fields of data for this symbol row, e.g. PBA, escapement and LH. The PBA field identifies that address in the page buffer 160 which represents the first character C1 on this symbol row. The page buffer has effectively two fields, the first, US, identifies the type and location of underscores and the second identifies or points to a location in the address escapement memory 150. The address escapement memory 150 includes three fields, one is a font reference address (FRA) and the other two fields identify the size of this particular symbol. Because of the particular print case (normal, left to right scan progression) the font is addressed at the FRA, and a 32-bit word representing SAW1 (see FIG. 3B) is read out and transmitted through the aligner to the scan buffer. The scan assembly logic, since it has access to the other two fields of the address escapement memory, determines that additional font data is required for this particular scan; the font addressing is therefore modified depending on the print case (by an amount corresponding to the escapement for this particular symbol) so that the word SBW1 is addressed. The data read out of the font is also sent on through the aligner to the scan buffer. This operation continues to successively address SCW1, SDW1 and SEW1. After all five words have been read, the scan assembly logic determines that the valid character height has been completed. However, the scan assembly logic, by comparing the quantity of data already read from the font with the line height, can determine the quantity $f_1$, see FIG. 5A, which must be filled to the next base line. This information is provided to the aligner 120 where appropriate fill bits are added. The escapement field (which was read from the address escapement memory 150) is then coupled from the scan assembly logic and written into the column position escapement memory 170. Thus the next time this particular entry in the column position escapement memory is accessed, the page buffer address and line height fields will be identical to the fields contained in this entry when the CPE memory 170 was originally accessed. However, the escapement field, which when initially accessed had a null field, now has the symbols's escapement value stored. At this point we can begin extracting data for the next symbol row in the scan direction. This is effected by incrementing the pointer to the CPE memory 170 so that we access the next entry. The next and succeeding entries are handled in exactly the same fashion as has already been explained. This action continues until a scan is terminated. At this point, the pointer to the CPE memory 170 is reset, so that it points to the original entry, the entry for the first symbol row.

Thereafter, data for the next scan is assembled in a manner identical to that already referred to, with two differences. In the first place, on the next scan we do not wish to read the first "column" of the font, that is SAW1-SEW1, rather we wish to read SAW2-SEW2. As described below (see equations 1-3), the FRA is modified by current escapement to locate SAW2. From there, we access SBW2, SCW2, etc., in exactly the same fashion as already described. The addressing, depending as it does on the escape field from the CPE correctly calculates the desired font address. As the escape field is altered on successive scans the appropriate font column is accessed. The other difference is that at the conclusion of the second scan of the character the escapement value before it is rewritten into the CPE memory 170 will be decremented. As a result, when we have reached the last scan of a character, the escapement value read out of the CPE memory 170, just prior to the scan, will be unity. This identifies that after that portion of the scan for the character has been developed, when the CPE entry is rewritten, the escapement value written is null, and the page buffer address is modified. For normal print cases the modification will be of a value unity, and for the left to right scan the modification will be incrementing the old value. This allows the CPE entry (specifically the PBA field) to now point to the next character on that symbol row.

For print cases in which scan progresses right to left rather than left to right, there are two differences in the addressing operation. In the first place, when we initially access the font, although the address escapement table provides us with the FRA, the first access to the font is not at the FRA, rather it is to a value corresponding to FRA+ESC−1. Reference to FIG. 3B will indicate that the first word read from the font for a right to left scan progression is SAWn. The next word read on the same scan is SBWn, then SCWn, etc. On the next scan we access SAWn−1. That is, rather than incrementing the font addressing between scans, we decrement the font addressing between scans. The changing value of the escape field of the CPE determines the offset from the initial access for font addressing on different scans. Furthermore, when we have completely escaped through a character, rather than incrementing the page buffer address field in the CPE memory 170, that field is decremented.

For rotated print cases, there are several differences, and reference to FIG. 5B will illustrate the necessity for those differences. In the first place, in the normal print case the font is addressed for two successive symbols by going from symbol row to symbol row (in the direction of the scan), and thus each symbol is necessarily located on a different symbol row from the just preceding symbol. This necessitates, for the normal print case, incrementing the pointer to the CPE memory 170 after each symbol has been accessed. In the rotated cases, that is not at all the case. In the rotated print case (see FIG. 5B) a scan sequentially crosses characters on a given symbol row. A given scan for example may intersect characters 11, 12, 13, 14 and 15 in sequence. Accordingly, after we have accessed the data from a given symbol, we do not increment the CPE pointer, rather we increment the page buffer pointer to access the next character on that symbol row. Another difference is as follows. In the normal print case, after we have completely accessed the data from a given symbol for that scan, we determine how much to fill by determining the difference between the symbol height and the line height; that determination is made after the font has been accessed for that symbol. In the rotated print case, depending on the scan progression, we may have to precede font data with fill data. Accordingly, for the rotated print case, we access the CPE table at the location corresponding to our pointer; this identifies a page buffer address from which we can address the address escapement table and ultimately the font. Before outputting data, however, we must check whether we are "inside" or "outside" the associated character box, this requires us to form the difference between the line height and the character height and check the print case as well as current escapement.

Once the character generator determines that the scan lies within a character box, then processing is very similar to that for the normal case. More particularly, the PBA field in the CPE memory is used to extract a pointer from the PB memory which is a pointer to the address escapement memory. This provides us with a font reference address (FRA). Depending on the print case (see FIG. 3B) the font is accessed either at the FRA or at the address FRA+ESC−1. In either event, the 32-bit word at the identified font address is extracted and sent on to the aligner. The font is then successively addressed to read out a "column" of data. When all the valid data is output, the PBA field originally extracted from the CPE memory is merely incremented so as to address the next character. Each time a new character is addressed, we go back again to check to see if the scan is inside or outside the character box and continue as already stated.

For normal printing, data representing underscore bits are added in the aligner, which is described below. For rotated print cases, however, underscore lies parallel to the scan direction. To implement underscore in the rotated print cases, the SAL logic forces its output to the aligner to be black for the duration necessary to represent the underscore, for each of the desired underscore representations. In the embodiment actually constructed there were several different types of underscore, the US code identified the particular type and thus identified a selected one or a set of scans during which the SAL forced the aligner to black to represent the desired underscore.

In the rotated print cases, when the scan is complete, we must determine if we have also completed the symbol row the scan is within. If not, we go back to the original CPE entry (pointing to the first character on the symbol row) and repeat the procedure already described. If we have also completed the symbol row, then we increment the CPE pointer and extract the next CPE entry. Thus normal printing traverses the entire CPE table once per scan, for rotated printing we traverse the CPE table once per page.

For both normal and rotated print cases, the preceding processing provides for printing in two cases in normal printing and two cases in rotated printing, for four cases total. The print capability is multiplied by a factor of two by controlling the direction in which the scan buffer is read. As has already been described, the scan buffer is written in a predetermined order with data from the aligner. However, for any of the four print cases already described, the scan buffer can be read either in the same order in which it was written or in an order reverse thereto.

As is shown in FIGS. 1B and 2 the aligner 120 receives a data stream from the font memory 140 as well as control information from the scan assembly logic 110. The font memory is constrained to read out 32 bits at a time, the aligner, however, need not accept or pass on to the scan buffer all 32 bits received from the font memory. For example the address escapement memory identifies the size of the character in the scan direction. For each fetch from the font, a fixed number of data bits are provided. The SAL forms the difference between the remaining character height and the fetch to determine valid height. If this difference is less than the fetch, the excess is ignored. The CPE memory identifies the height of the symbol row. Using this information the aligner can suppress certain of the bits of a 32-bit word received from the font memory if the data stream (sum of font fetches on the scan) exceeds this line height. To the extent that the line height exceeds the character height, the scan assembly logic provides a signal to fill with white. The scan assembly logic also provides to the aligner information representing underscore; for normal print cases (where the scan direction is perpendicular to the underscore representation) the information results in controlling a few bits in the 32-bit word to black, the number of bits actually controlled and the location of those bits is determined by the type of underscore selected. For rotated print cases, the scan assembly logic provides a control signal to the aligner to force a stream of black bits (since in rotated print cases the underscore is parallel to the scan direction).

In an embodiment actually constructed, the font memory provided 32-bit words, the scan buffer accepted 16-bit words. The aligner handled this translation, deciding which of the 32 data bits received from the font memory were valid and realigning it so as to provide 16-bit words to the scan buffer.

One further capability of the character generator worth describing at this point is the use of presentation font or the magnification function. In the absence of magnification there is a constant ratio between the size of the ultimate output, e.g. the printed record representing a particular symbol, and the number of bits employed in the font memory to represent that symbol. It is the purpose of the magnification function to increase that ratio; in an embodiment actually constructed that ratio can be selectively multiplied by 2 or 4, independently in orthogonal directions, on a page basis, e.g all symbols on a given page have the same magnification. For both directions the magnification function is implemented at the scan buffer. The scan buffer is arranged to store a complete scan, and actually the memory set aside for the scan buffer is capable of storing two complete scans. For convenience these can be referred to as SA (scan buffer A, of a capacity capable of storing a complete scan) and SB (scan buffer B, of identical capacity). SA and SB are controlled so that while the character generator is writing SA, for example, SB can be read out to provide the desired binary stream which is used for example to modulate a laser beam. The magnification function will be described assuming that SA has been written with data representing a complete scan. The magnification function is implemented in reading the scan buffer, so the example to be described refers to reading SA, after it has just been written. The data is serialized in two steps or stages, first a convenient swath (say 16 bits) is read from the scan buffer and those 16 bits are serialized. Following that, the next 16 bit swath is read and serialized, and so on. Assuming we desire non-unity magnification in a direction perpendicular to the scan direction, after we have completely read out SA, we re-read it so that on the second reading an identical scan will be produced. This of course will multiply the size of the symbols in the direction perpendicular to the scan direction. To multiply the size by a factor of 4, we read SA four times.

Magnification in the direction of the scan is handled in a different fashion. When 16 bits are read out of SA, those 16 bits control a fixed number of pels in the output record, for convenience we can assume that each bit controls two pels. This is considered unity magnification. For two times magnification we arrange the serialization so that each bit rather than controlling two pels controls four pels. To do this, rather than serializing all 16 bits, we divide the 16 bits into two groups of eight bits each and first serialize the first group and then the second. To provide for magnification by a factor of four, we break the 16 bits down into four groups of four bits each, and we serialize in four separate operations. It should therefore be apparent that magnification in the two different directions are independent operations and therefore we can independently select on magnification in those two different directions. It should also be apparent that while an embodiment of the invention provides for magnification by factors of 1, 2 and 4, a similar magnification technique can be used to magnify by other integer amounts in either or both directions.

FIG. 4 is a block diagram of the addressing mechanism for the column position escape memory 170. As has already been indicated, depending on whether we are in normal or rotated print mode, the column position escape table (stored in the column position escape memory) is used in a different fashion. In the rotated print mode, the column position escape table has an entry for each different symbol row. That entry is accessed when we begin printing that symbol row, and we do not increment the CPE address (the location of the entry) until the entire symbol row has been completely printed. At that time we increment the CPE table address to access the next entry in the CPE table. When in this fashion we have completely incremented through the CPE table, we have finished printing a page. Accordingly, CPE table addressing for the rotated print mode is relatively simple, e.g. at selected times we merely increment the address.

For normal printing, however, addressing is little more complicated. In normal printing the CPE table is in form identical to that for rotated ode printing, e.g. a single three-part entry for each symbol row. Because each symbol will require many scans, and a scan crosses many symbol rows, we will increment the CPE table address each time the scan progresses through the symbol row, and it will of course scan through the symbol row many times for a single symbol. In order to keep track of where we are in a given symbol row, we will rewrite the CPE table entry for that symbol row. Furthermore, because the character generator is pipelined, we may actually read data from a given symbol row before we rewrite data for the preceding symbol row. FIG. 4 is a block diagram showing the addressing apparatus for the column position escapement memory. More particularly, we employ a pair of latches 173, 174, the output of both of which goes to a multiplexer 175. The output of the multiplexer 175 is provided to a latch 176, from which the CPE addressing is obtained. The output of the latch 176 is fed back to an incrementing device 172 which is controlled at appropriate times depending on the relation between scan progression and size of the symbol being scanned. In operation, let's assume that we provide the address for the first entry in the CPE table to the latch 173. By appropriately controlling a multiplexer 175, we can transfer that address to the latch 176 which is actually used to address the CPE memory 170. At the time the scan of that symbol row is completed, the address (present in the latch 176) is coupled (without incrementing) into the latch 174, and the same quantity is incremented and placed in the latch 173. Accordingly, when it is necessary to read the next entry in the CPE table, we use the modified contents present in the latch 173, coupled through the multiplexer 175 and stored in the latch 176 to actually address the CPE table. When, subsequent to that last mentioned addressing operation, it is appropriate to rewrite the preceding entry in the CPE table for the preceding symbol row, we use the data in latch 174. At the conclusion of scanning of the symbol row whose address is now present in the latch 173, the same operation is repeated. The RESET signal resets the CPE addressing structure. In normal printing we use RESET at the end of each scan.

It should also be apparent how the apparatus of FIG. 4 can be used for the simpler rotated mode addressing. In rotated printing RESET is used only at the end of scanning the entire page.

From the point of view of the apparatus of FIG. 4, the only difference between normal and rotated mode printing is the time between sequential increments of the CPE address. In normal mode printing, this signal appears once per symbol, in rotated mode printing it appears once during the entire scan of a complete symbol row.

DETAILED DESCRIPTION

The character generator, and the associated scan assembly logic runs on two cycle clocks, each of 1500 nanosecond period. Of the two clocks, the first is referred to as either RPAF* or RPAS*, and the second is referred to as RPBF* or RPBS*. Since a character or symbol can be made up of more than one "slice" of font data (e.g. the character box is larger than 32 bits in the direction of scan), the scan assembly logic generates two sets of clocks. RPAF* and RPBF* are used only during the generation of the first font address for any scan of a character (e.g. these clocks are used once per scan per character box). On the other hand, RPAS* and RPBS* are generated for every font address generating clock cycle. The processor can demand a cycle from one of the character generator memories at any time and thereby stop the scan assembly logic from clocking for a 1500 nanosecond period. Thus by determining that valid height (remaining character height) exceeds zero, an additional cycle of RPAS* and RPBS* is generated. This process continues until valid height is zero (the scan has left the character box).

Figure 8:
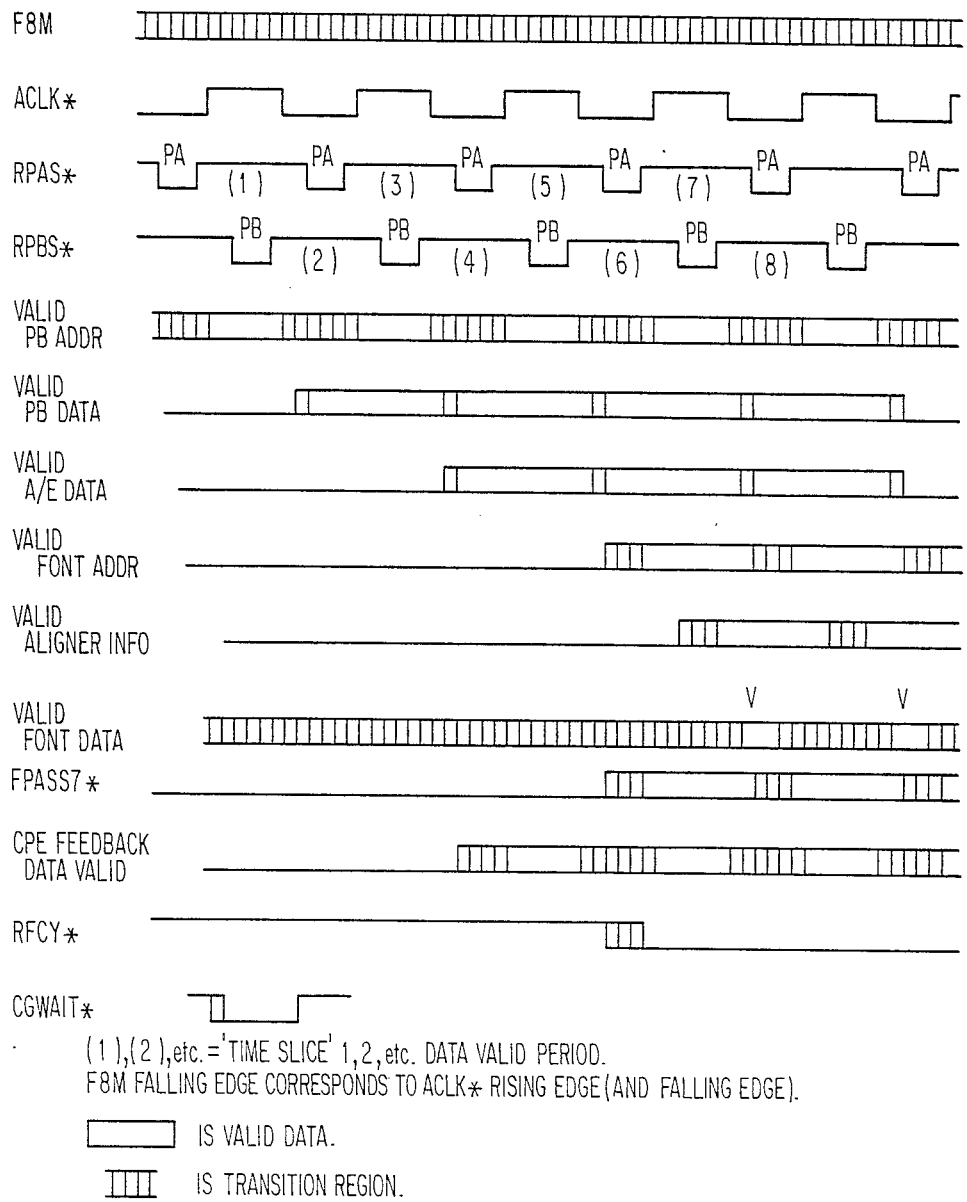
FIG. 8 illustrates system timing of different data items relative to a typical clock rate.

All the font addressing is pipelined, that is there are several characters being worked on at a time but at different stages of processing. As shown in FIG. 8, all clocking and data transfers are synchronized to the signal F8M (the uppermost line of FIG. 8) representing an 8 MHz clock. The third and fourth lines respectively show the clocks RPAS* and RPBS*; each of which has four time slices per cycle, RPAS* is associated with the odd time slices (1, 3, 5 and 7) whereas RPBS* is associated even time slices (2, 4, 6 and 8). During time slice 0 (that is, time slice 8 of a preceding cycle), data from the CPE table is valid. During time slice 1 addressing for the page buffer 160 is valid. During time slice 2 data from the page buffer 160 is valid. During time slice 4 data output from the address escapement table (A/E) is valid. During time slice 5 data to be written to the CPE table is valid. During time slice 6 that data is actually written. During time slice 7 addressing of the font memory 140 is valid, and during time slice 8 data from the font memory to the aligner 120 is valid.

Figures 9, 10, 11:
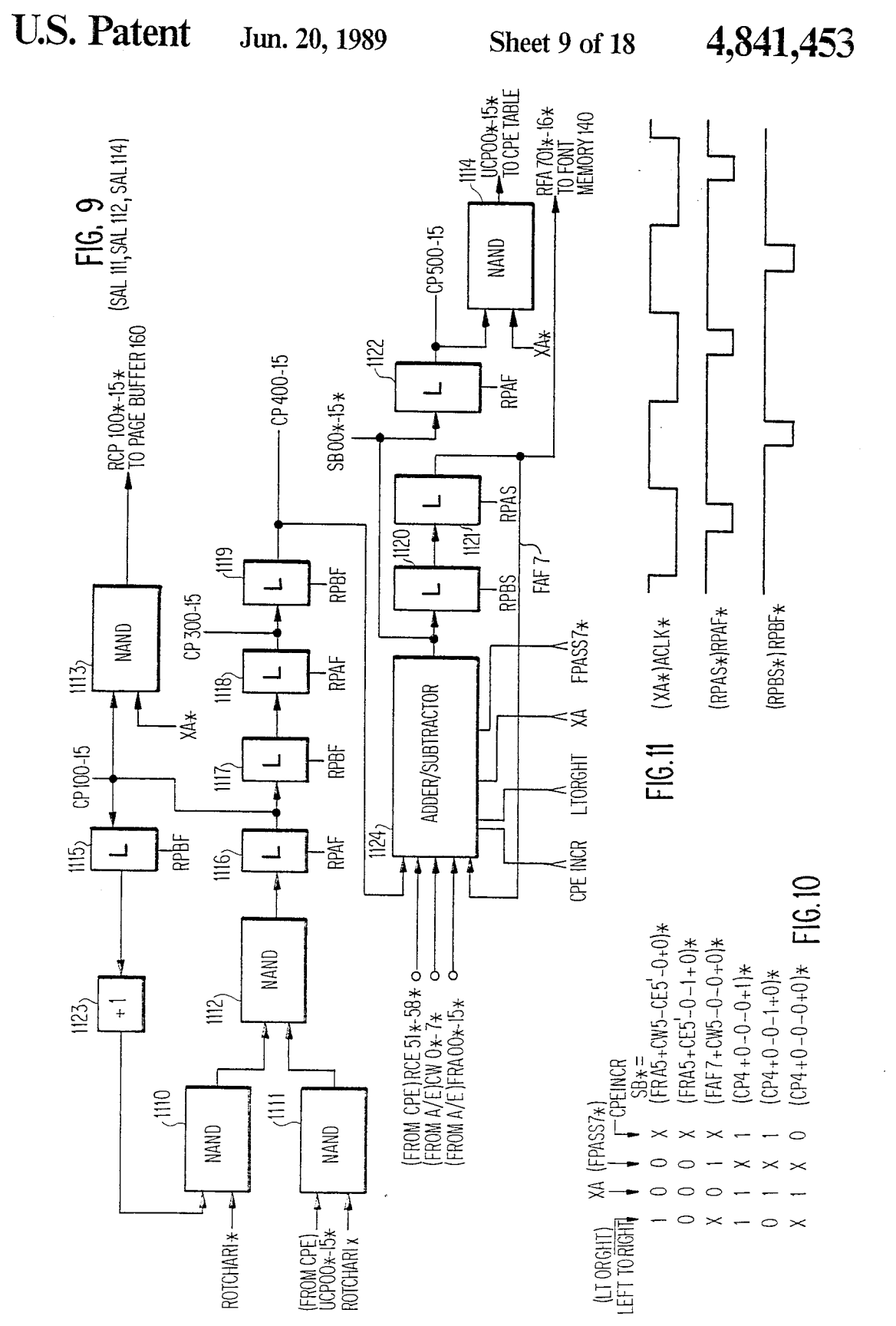

FIG. 9 is a more detailed block diagram of the SAL elements 111, 112 and a portion of element 114. More particularly, the scan assembly logic 111 receives as an input the PBA output of the column position escapement memory 170 comprising the signals UCP00*-15*, along with several other signals; reference to FIG. 9 shows specifically those other signals. The output of the SAL element 111 is the signal UCP00*-15* input back to the column position escapement memory 170. The SAL element 112 is also subject to the input UCP00*-UCP15*. Its output is the page buffer address identified in FIG. 9 as RCP100*-15*. Finally, the last output of the components shown in FIG. 9 is the signal RFA701*-16, the addressing for the font memory 140. In order to develop these signals, logic elements including NAND gates 1110–1114 are employed, along with several latches 1115–1122 (for timing purposes), an incrementing device 1123 and the major logical component, the adder/subtracter 1124. The circuitry allows the data written back to the CPE 170 (both PBA and escape) to be modified, under certain circumstances; it allows the FRA address to interact with the character width (CW) or character escapement (CE) signals under the appropriate circumstances as required to properly address the various memories under the different cases. The adder/subtracter 1124 operates on the input data based on the control signals LTORGHT (left to right), CPEINCR (increment PBA field of CPE), FPASS7* (indicating the first pass of a character) and XA (clock). The first control signal is derived from the print command (in register 105) written by processor 400 (identifying the print case being executed) and is unchanging throughout scan of an entire document. The control signal CPEINCR is calculated by the circuit of FIG. 13B. The control signal FPASS7* is calculated at FIG. 12B.

Figure 12B:
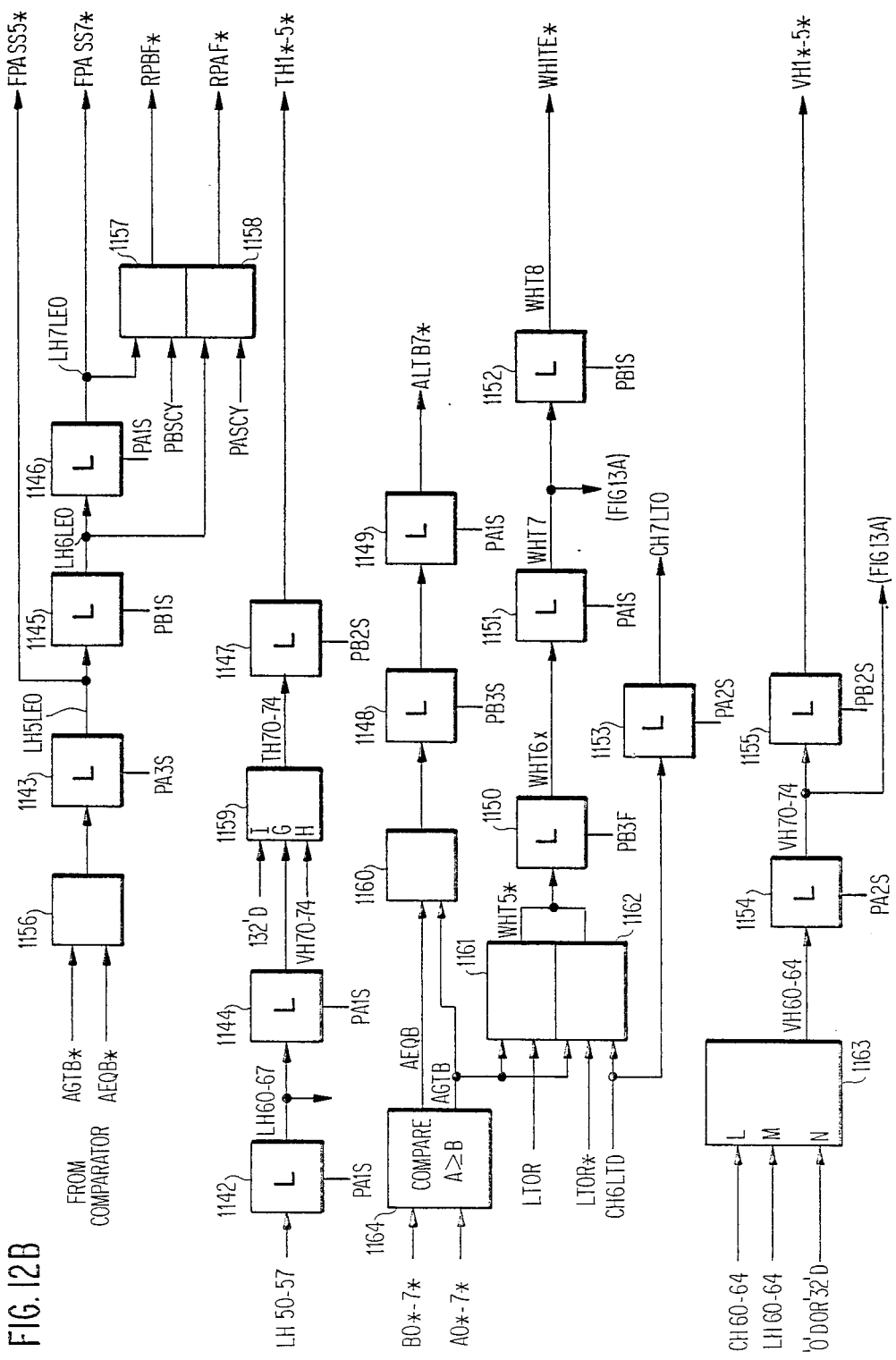
Figure 13A:
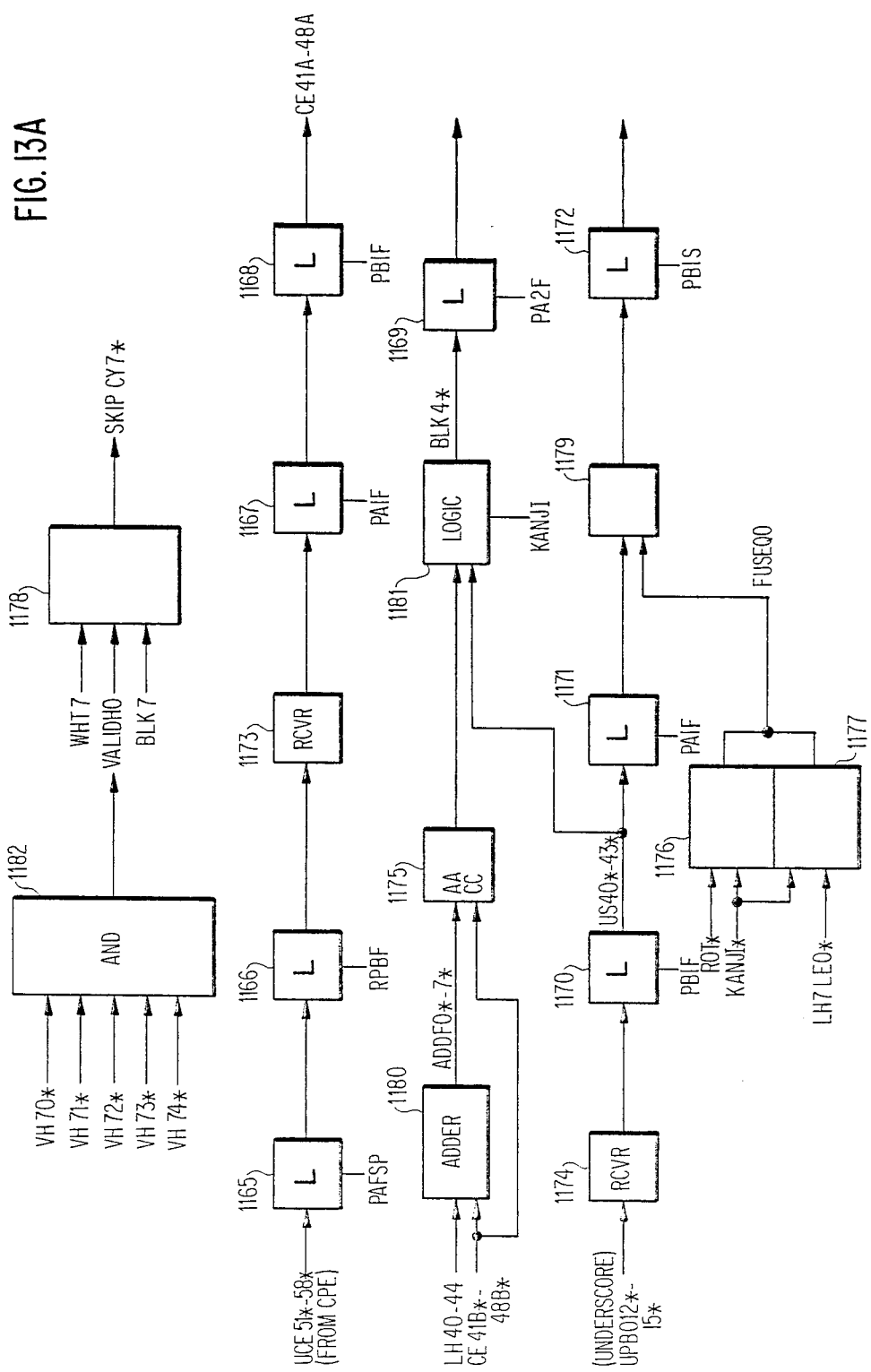
Figure 13B:
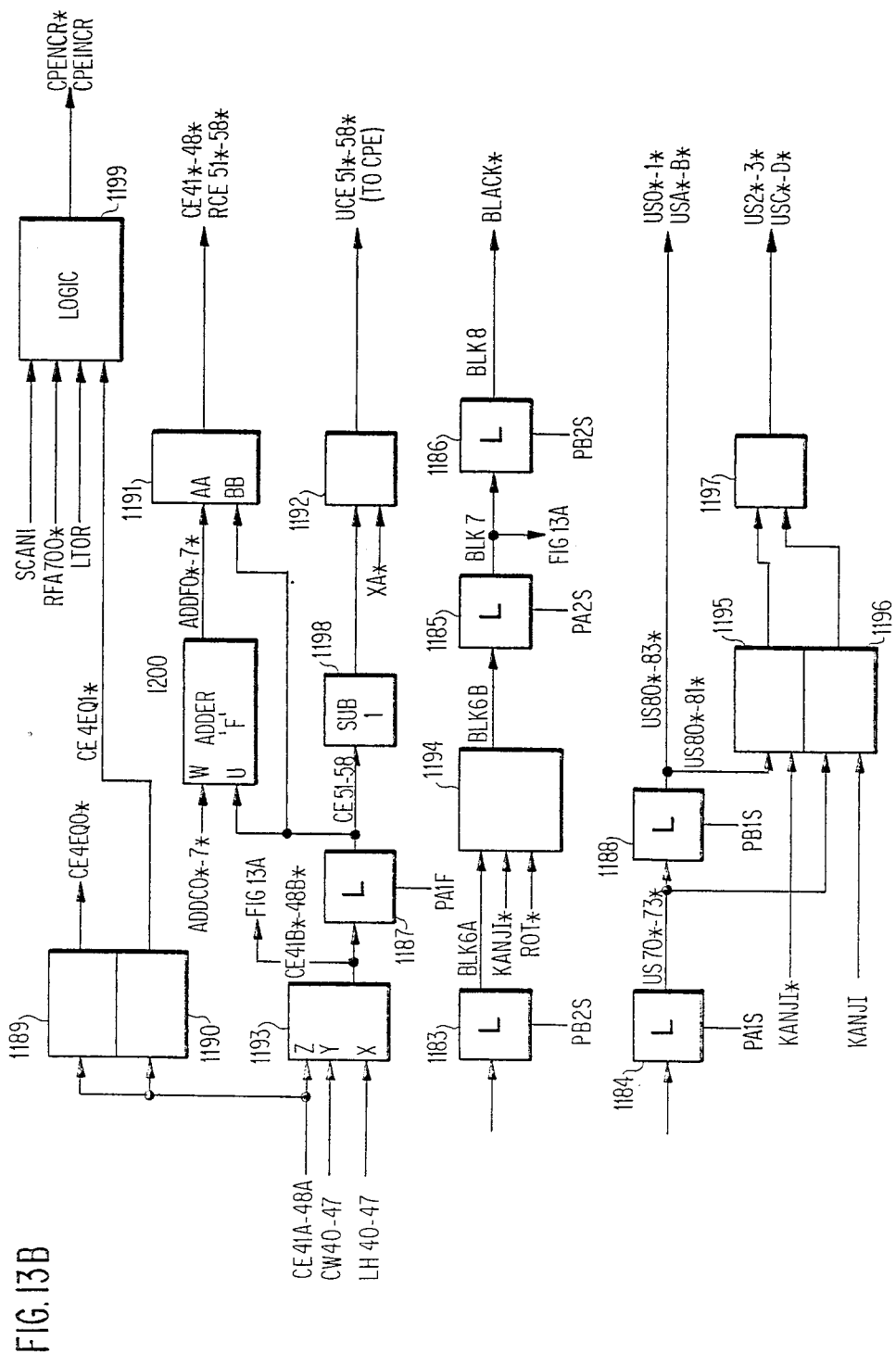

FIGS. 12A and 12B (when placed together such that FIG. 12B is to the right of FIG. 12A) and FIGS. 13A and 13B (when placed together such that FIG. 13B is the right of FIG. 13A) show more detailed block diagrams of the SAL elements 113 and 115 as well as the remaining portion of the element SAL 114. More particularly, SAL element 113 produces the revised character escapement quantity to be rewritten into the CPE memory 170. This signal is developed as the output of the multiplexer 1192 (FIG. 13B); one of the inputs to the SAL element 113 is the UCE58-UCE51 signal read from the CPE 170, and that input is applied to the latch 1165 (FIG. 13A). The latches 1167, 1168 delay the quantity and input it to the multiplexer 1193 (FIG. 13B), along with CW and LH. Thus either CW or CE passes multiplexer 1193 (CW on the first scan, CE on subsequent scans). The quantity is decremented by the subtract circuit 1198 to form the revised escapement to be rewritten.

There are a number of inputs to the SAL elements 114 and 115; the pertinent output of the SAL element 115, applied to the aligner 120, are the valid height signals (VH1*-5*), white (WHITE*), all developed from the hardware shown in FIG. 12B, as well as the output BLACK* and the underscore signals (USO*-1*, USA*-B*, US2*-3* and USC*-D*) all developed in the circuits in FIG. 13B.

The column position data bus (the output of which is the NAND gate 1113) which calculates the page buffer address needed by the scan assembly logic, operates in either a normal or rotated mode. A signal ROTCHAR1* is 0 in the normal mode or in the rotated mode when the scan assembly logic is doing the first addressing calculation for the "rotated" scan. When ROTCHAR1* is 0 the scan assembly logic can load the output of the CPE memory 170 (UCP00*-15*) into the latches 1116. This latched page buffer address then goes off chip (via NAND gate 1113).

In a normal print the UCP00*-15* data is pipelined out until time slice 5 and then written back to the CPE memory 170 along with an updated current escapement (UCE51*-58*).

The UCP00*-15* has unity added or subtracted (depending on the LTORGHT signal) for a particular line when the escapement for that line equals 1, so that on the next scan the scan assembly logic can access the next character to be printed for that symbol row. This is effected in logic 1199 (FIG. 13B) which develops CPEINCR input to adder/subtracter 1124. The CPE write is delayed until time slice 5 so that the UCP00*-15* and the UCE51*-58* data buses can be written together using one CPE address.

In a rotated print the UCP00*-15* bus is loaded as before but only for the first character of a scan. Each sequential page buffer address needed is obtained by incrementing or decrementing the previous address (using the incrementing circuit 1123). For a rotated print the UCP00*-15* bus is not written back into the CPE although the current escapement is.

For a normal print the CPE memory address steps up 1 for each new symbol encountered. For a rotated print the CPE memory address steps up only when the current escapement equals 1 (we have scanned through an entire character) and a new symbol row must be printed (we have completed the scan of a row). The font address generating pipeline (the output of which is the latch 1121) operates in one of three modes:

(a) for the first 32-bit slice of font data for a character, in a left to right scan, (b) for the first 32-bit slice of font data for a character, in a right to left scan (in this mode the FRA, derived from the address escapement memory is modified to properly address the font for the right to left scan), (c) for the second, third, etc. 32-bit slices of font data for a character, either left to right or right to left (in this mode we merely add the ESC increment to obtain the next effective font address).

In mode (c), the font address, calculated using either the mode (a) or (b) technique for the previous clock cycle, has the character width added to itself and is then stored in the latches 1120. This data is latched up in the latch 1121 and is fed back to the adder/subtracter 1124 and to the font memory.

In mode (a) the font address is calculated as:

$$FA = FRA5 + CW5 - CE5' \quad (1)$$

That is, FA (or the font address) is determined by summing FRA5 (the font reference address at cycle time 5) plus CW5 (the current width at cycle time 5) less CE5' (the current escapement at cycle time 5). The current escapement is initialized to the character width, so at the initial character scan:

$$FA = FRA5 + CW5 - CE5' \text{ is also:} \quad (2)$$

$$FRA5 + CW5 - CW5 = FRA5 \quad (3)$$

On each subsequent scan the quantity CE5' is altered as compared to the previous scan, so we sequentially address different "columns" of the font.

In mode (b) the font address is calculated as:

$$FA = FRA + CE5' - 1 \quad (4)$$

where CE5' is the current escapement for a "normal" print or a "rotated" print in mode (a). Therefore, on the initial scan in a right to left scan progression, $FA = FRA + CW - 1 =$ (in terms of FIG. 3A) $FRA + ESC - 1$ or $SAWn$. $CE5' = CE + CW + LH$ for a rotated print in mode (b). So for a rotated print in mode (b):

$$FA = FRA5 + CW5 - LH5 + CE5 - 1 \quad (5)$$

Mode a or b is selected on the basis of the LTORGHT control signal identifying the aspect of the print command.

The foregoing is summarized in FIG. 10.

To reiterate, in the normal mode (such as shown in FIG. 3A) we begin accessing the font memory at FRA; this addresses the first "slice"; continuing in the scan direction we must access the second slice and that is FRA+ESC. Referring to FIG. 9 the FRA is one input to the adder 1124, and another is the ESC value corresponding to CW0*-7*. It should thus be apparent how the font address is obtained; initially it is the FRA, and for succeeding slices in the same scan we just add the CW value for as many slices as we need. The number of slices that is required is developed by continually subtracting the size of the slice (32 bits) from the character height. Character height information is coupled (from the address escapement memory A/E) via the receiver 1132 (FIG. 12A) and is delayed through the latches 1129, 1130 and fed back to the adder 1134. The other input to the adder "32D" corresponds to 32 bits, so that the output of the adder is the remaining character height. This is recirculated through the multiplexer 1140. When the adder 1134 produces in effect a negative result that signal is passed as CH6LTO (character height- less than zero), indicating that the character has been completely scanned. The signal CH6LTO is coupled through the multiplexer 1162 and latched up as WHITE*; this forces or fills white to the line height. Accordingly, when we have scanned all the slices in a character we fill white up to the next base line. When we reach the next baseline is determined by the line height. One of the inputs to the multiplexer 1141 is LH 40-47 so that when that input is enabled the signal B0*-7* is line height. At the same time, one of the inputs to the multiplexer 1138 is a 32-bit- slice, and when that input is enabled the signal A0*-7* corresponds to the decimal 32 (i.e. 32D). This is compared in the comparator 1164 and when A is greater B the signal AGTB is asserted. This develops LH5LEO to indicate that the line height has been scanned and the next line can begin. This signal controls the clock signals FPASS (to indicate another clock cycle for the symbol is necessary, i.e. another alice or RPAF, RPBF, to begin the next symbol). To begin the next base line, in normal mode the CPE memory pointer is incremented, as has been explained.

It should be apparent that in scanning right to left rather than left to right, the same operations regarding character height and line height are employed. The difference is that the first time the font memory is addressed we do not access it at FRA, rather we access it at FRA+ESC−1 (the second line of FIG. 10 or the address A′A′ of FIG. 3A). The next slice address uses the algorithm of mode (c), the prior address plus CW0*-7* (the character width). On the next scan the first slice is addressed at FRA+ESC−1 (the original address) −1; succeeding slices are address by simply adding CW0*-7*, as before.

For second and subsequent scans the same operation holds; however the CE5' value is continually modified to address the appropriate font "column".

To continue the summary, in the rotated mode (such as shown in FIG. 3D) we begin accessing the font memory (for left to right scan progression) at FRA; this addresses the first "slice"; continuing in a scan direction we must access the second slice and that is FRA+ESC. Referring to FIG. 9, the FRA is one input to the adder 1124 and another is the ESC value corresponding to CW0*-7*. It should thus be apparent how the font address is obtained; initially it is the FRA, and for succeeding slices in the same scan we just add the CW value for as many slices as we need. The number of slices that is required is developed by continually subtracting the size of the slice (32 bits) from the character height. Character height information is coupled (from the address escapement memory) A/E via the receiver 1132 (FIG. 12A) and is delayed through the latches 1129–1130 and fed back to the adder 1134. The other input to the adder "32D" correspond to 32 bits, so that the output of the adder is the remaining character height. This is recirculated through the multiplexer 1140. The same operation as that already explained for "normal" mode continues to determine when the character has been completely scanned. In normal mode, regardless of scan progression, the scan, once it reaches a base line, is immediately within a character box (see FIG. 3A) and the fill process occurs after the scan leaves the character box and before it reaches the next base line. In rotated printing (where the scan is parallel to a base line) the fill process occurs either after the scan passes the character box and before it progresses to the next base line (as in normal printing) or after the scan passes a base line and before it reaches the character box, depending on the scan progression (see FIG. 3D).

Another distinction between the normal and rotated printing modes is as follows. In normal printing, character height (CH) and line height (LH) interact in one pipeline (for example to determine when to "fill") and current escapement and character width interact (to determine when we have completely escaped through a character so that the PBA must be incremented to access the next character). In rotated printing, character height (CH) is more less an isolated pipeline and in fact operates exactly as in normal printing for the case wherein the character height and the line height are identical. Reference to FIG. 3D shows the basis for this statement, e.g. along the scan direction the character box is equal to the character height and therefore as soon as we have scanned through the character we must access the next character (i.e. there is no "fill"). However, in rotated mode printing character width (CW), escapement (CE), underscore and line height (LH) interact. As has already been mentioned, underscore is implemented by forcing the signal BLACK* to zero. Filling with white (between the top of the character box up to the line height) is effected by setting the signal WHITE* to zero. In rotated printing, the escapement value (which was originally a null field in the CPE table) was initialized to the line height (as opposed to the character width which is the case in normal printing).

For left to right printing, in rotated mode, we "fill" if CE is greater than CW, and for so long as it is greater CW. Once CE equals CW, then we have reached the character box and we can begin outputting font data (see FIG. 3D). On the other hand, for right to left printing we must "fill" if CE is less than the difference between line height and character width, and for so long as it is less than that difference. Likewise, the underscore is added, for left to right printing when the CE is small. For right to left printing in rotated mode the underscore is valid if the sum of unity plus the difference between line height and CE is small.

Figure 26:
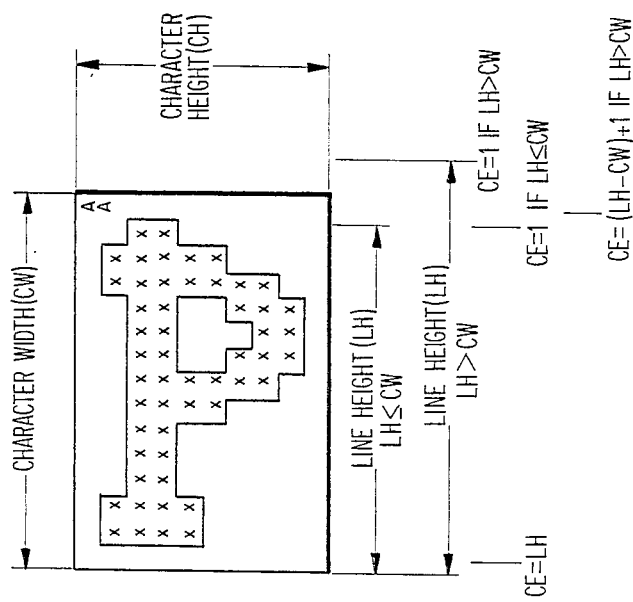
FIGS. 25 and 26 are useful in explaining different criteria used to start and end white fill in the two rotated print modes.
Figure 25:
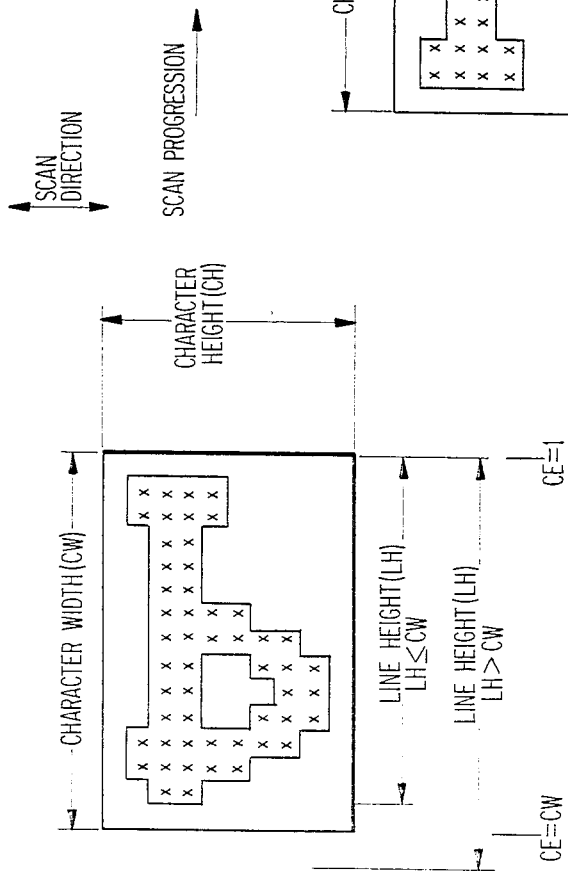

In order to explain operation of the SAL for rotated mode, reference is made to FIGS. 25 and 26 showing, respectively, the scan direction and scan progression relative to a character for the two different cases in rotated printing, FIG. 25 corresponds to LTORGHT (or top to bottom), FIG. 26 corresponds to LTORGHT* (or bottom to top). In rotated mode, character width (CW), character escapement (CE) and line height (LH) all interact. Furthermore, current escapement (CE) is always initialized at line height LH, see FIG. 13B where the multiplexer 1193 can pass LH40-47 through to output UCE51*-58*.

Referring to FIG. 25, we first note that if LH is greater than CW, then we are in a region where we must fill with white. Accordingly, the comparator 1164 (FIG. 12B) compares these quantities; CW and CE, the latter having been initialized to LH. If $A \geq B$, then the AGTB output of comparator 1164 is asserted which is coupled through the multiplexer 1161 as WHITE*. The signal will remain in this condition until CE has been decremented to be less than CW, and when that occurs data extraction from the font memory can begin.

In the LTORGHT* mode, we must force white if $CE \leq (LH - CW)$. Of course, since CE is initialized to LH, in the first several scans the inequality will not be true, it will only be true near the end of the scan of a particular symbol row that this inequality can be satisfied. The same comparator 1164 performs this function, its A0*-7* input is the same CE signal (from multiplexer 1138). However, in this case, the input B0*-7* is the output of adder 1135 coupled the multiplexer 1141. As is evident from FIG. 12A, the output of adder 1135 is the signal LH5-CW5. If the AGTB signal is asserted, it is coupled through multiplexer 1162 (when LTOR* is present) and generates WHITE*. In simple terms, for the case shown in FIG. 26, the difference between line height and character width is of course a constant. Current escapement CE is initialized to LH, but as we scan through the symbol row, it is decremented. At that point during this process, when the difference between LH and CW is equal to the current escapement, we have completely scanned through the character. Thereafter, and so long as CE is positive, we fill with white. When CE is decremented to one, we are on the last scan, e.g. the symbol row is about to be completed.

Figure 22:
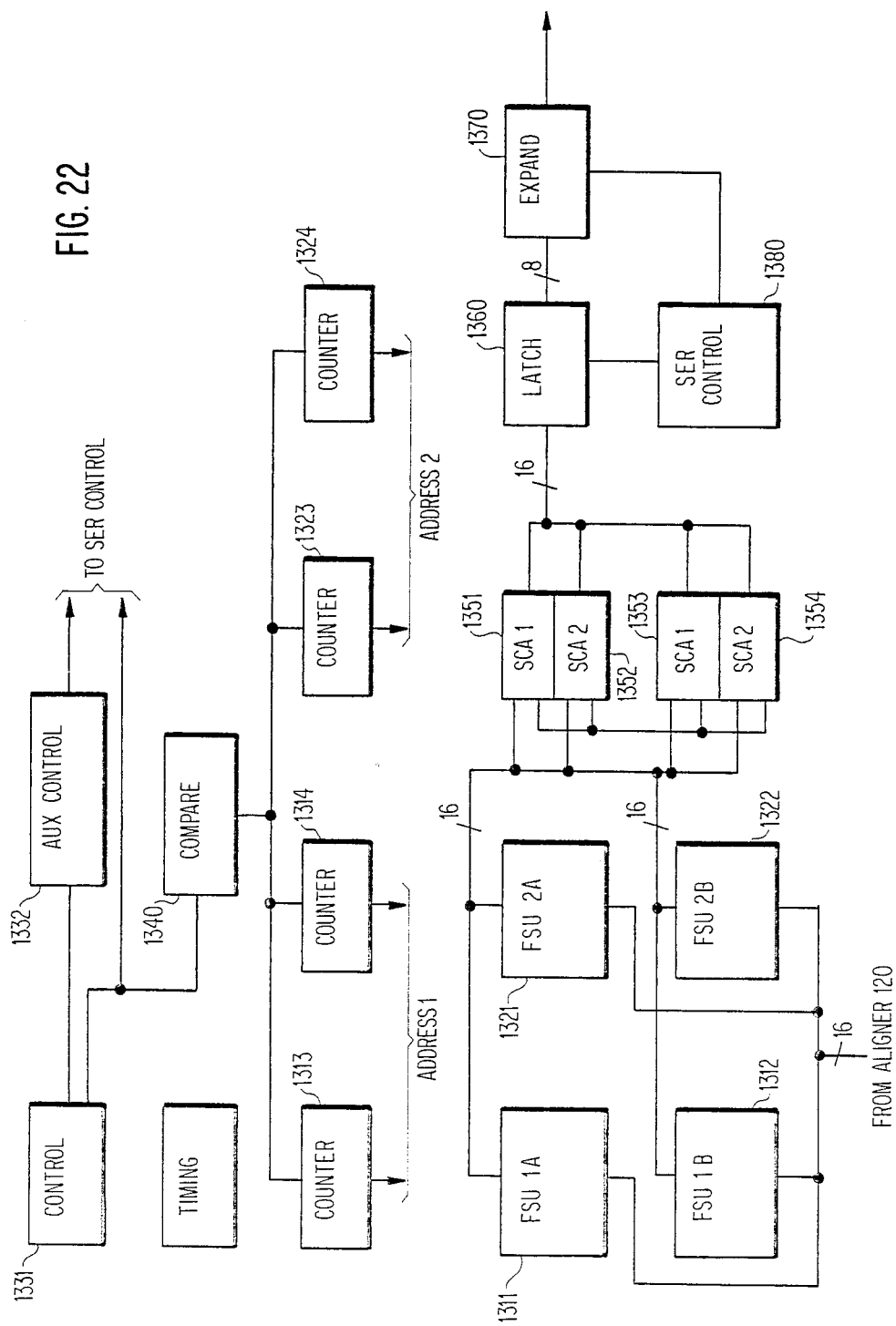

FIG. 22 is a block diagram of that portion of the character generator which lies between the aligner 120 and the character generator output, and generically can be referred to as the scan buffer. The scan buffer 130 includes two buffers (FSU 1 and FSU 2), each capable of storing data defining a complete scan; in the course of printing the functions performed by the buffers 1 and 2 ping pong such that while one buffer is being written, from the aligner 120, the other buffer is being read. In an embodiment of the invention which is described herein, each of the buffers included a pair of chips such that buffer 1 includes chips 1311 and 1312 whereas buffer 2 includes chips 1321 and 1322. Each buffer is addressed by a dedicated address counter, the address counter for buffer 1 is made up of counters 1313 and 1314 whereas the address counter for buffer 2 is made up of counters 1323 and 1324. The control for the counters as well as the buffers is implemented by the control chips 1331 and 1332 and a compare chip 1340. When a buffer is selected for the writing function (to be written from the aligner 120) the associated address counter is controlled to count up from zero to a value corresponding to the page length, the page length value is coupled to the compare circuit 1340 in order to properly control the associated counter pair. In four of the print cases, the page length value coupled to the compare element 1340 is the actual page length, whereas in four other print cases (where the scan direction is perpendicular to the page length) the value submitted to the compare element 1340 is actually the page width.

When a buffer is selected for the reading function, the associated address counter may either count from zero up to the page length (or width) or from the page length (or width) down to zero, depending upon the scan direction (see FIGS. 14-21). When the counters count down rather than up, the scan buffer is read in the reverse order. This has the effect of reversing the scan direction.

As has already been mentioned, using the presentation font feature of the invention, the font as printed can be expanded either parallel to the scan direction or perpendicular to the scan direction. In order to expand the font perpendicular to the scan direction, a scan buffer may be read more than once before it is rewritten with new data. For example, in order to double the size of the font perpendicular to the scan direction, the scan buffer will be read twice before it is rewritten. In order to expand the font by a factor of four, the scan buffer will be read four times before it is rewritten. This function is handled by the control blocks 1331–1332 by controlling the addressing counters and the binary signal which selects the function to be performed.

As has already been described, the font can also be expanded in the direction parallel to the scan direction. In order to perform this function, each bit in the scan buffer must be used to control more pels than the bit controls for unity magnification. This function is performed by the latch 1360 and expand block 1370, as will now be described.

When data is read from the scan buffer, it is coupled through the multiplexer 1351–1354 to the latch 1360. The input to the latch 1360 is a 16-bit wide data bus, the output of the latch 1360 is an 8-bit wide data bus, which forms an input to the expand block 1370. One function of latch 1360 is to divide the 16 input bits into two groups of output bits, each group of 8 bits. The output of the expand block 1370 is also eight bits wide. However, the eight bits at the output of the expand block 1370 may be driven by:

(1) The eight input bits (in the case of no expansion or unity magnification), or
(2) Only four bits at the input (where a pair output bits are controlled y a single input bit) in which case each eight input bits produces two groups of eight output bits, in time sequence, or
(3) The eight output bits may be derived from only two input bits, so that each of the two input bits controls four output bits; in this case of course the eight input bits are transformed into four groups, each of eight output bits, in time sequence.

FIG. 23A is a more detailed block diagram of the latch 1360 and expand block 1370.

As shown in FIG. 23A, the 16-bit data bus forms an input to a 16-bit master register 1361. The master register 1361 feeds 16 bits in parallel to a multiplexer 1362. Multiplexer 1362 has two 8-bit outputs, a first is provided to a slave register B 1363 and a second is provided to multiplexer 1364. Another input to the multiplexer 1364 is provided by the eight output bits of the slave register B 1363. The eight output bits of the multiplexer 1364 are the input to the slave register A 1371. The output of the slave register A is coupled to an expand function block 1372, the output of which (eight bits) is provided to the driver 1373 which drives the eight output bit bus. Not shown in FIG. 23A, but included in the character generator, is a serializer to serialize the 8-bit output bus. The 16 input bits to the multiplexer 1362 D0–D15 can be output in either two fashions; bits 0–7 can be output through the multiplexer 1364 to the slave register A 1371 and bits 8–15 can be output to the slave register B 1363. The latter eight bits will subsequently be input via the multiplexer 1364 to the slave register A 1371. This is the mode of operation in four print cases all having a common scan direction. In those print cases in which the scan direction is reversed, the operation is altered as follows. Bits 15–8 are output via the multiplexer 1364 to the slave register A 1371 in reverse order, that is slave register A bits 0–7 correspond to bits 15–8 from the master register 1361. The other eight bits, now master register bits 0–7 are input (again, in reverse sequence) to the slave register B 1363 where they can be later coupled via the multiplexer 1364 to the slave register A 1371 (still in reverse order) so that the slave register bits 0–7 correspond to the master register bits 7–0. It will be apparent therefore that this operation assists in the reverse scan out, and when taken in conjunction with the ability of the scan buffer address counters to count up or down, provides the ability for the scan direction to be reversed. FIGS. 23B through 23D illustrate three different cases for the expand function 1372. For the case of unity expansion, the eight bits in the slave register 1371 are used to control eight bits in the driver 1373; this provides of course for unity magnification, and is illustrated in FIG. 23B.

FIG. 23C shows how magnification by a factor of two is implemented via the expand function 1372. In a first stage, the expand function 1372 provides for the connectivity between the slave register 1371 and the driver 1373 as shown in FIG. 23C1, e.g. the first four bits in the slave register 1371 each drives two bits in the driver 1373. Thereafter, the expand function 1372 alters the connectivity between the output of the slave register 1371 and the driver 1373 to that shown in FIG. 23C2, e.g. the previously unused bits in the slave register 1371 are used to control the driver 1373, again with each bit in the slave register 1371 driving two bits in the driver 1373.

Finally, FIG. 23D shows a portion of the connectivity provided by the expand function 1372 in the case of magnification by a factor of four. As shown in FIG. 23D1, one quarter of the output bits in the SA register 1371 are used to control the driver 1373, wherein each bit in the slave register 1371 drives four bits in the driver 1373. Thereafter the expand function 1372 is altered so as to control the driver 1373 with a different pair of bits from the slave register 1371. FIG. 23D2 shows the last phase of the expand function in four times magnification wherein the last pair of bits in the slave register 1371 are used to control the driver 1373, again each bit in the slave register which is employed drives four bits in the driver 1373. It should be apparent therefore that by stepping through the different states the expand function may multiply the size of the font (in the direction of scan) by factors of two or four. It should also be apparent that by using the principles as herein disclosed, other integer magnifications could be implemented.

Figure 24:
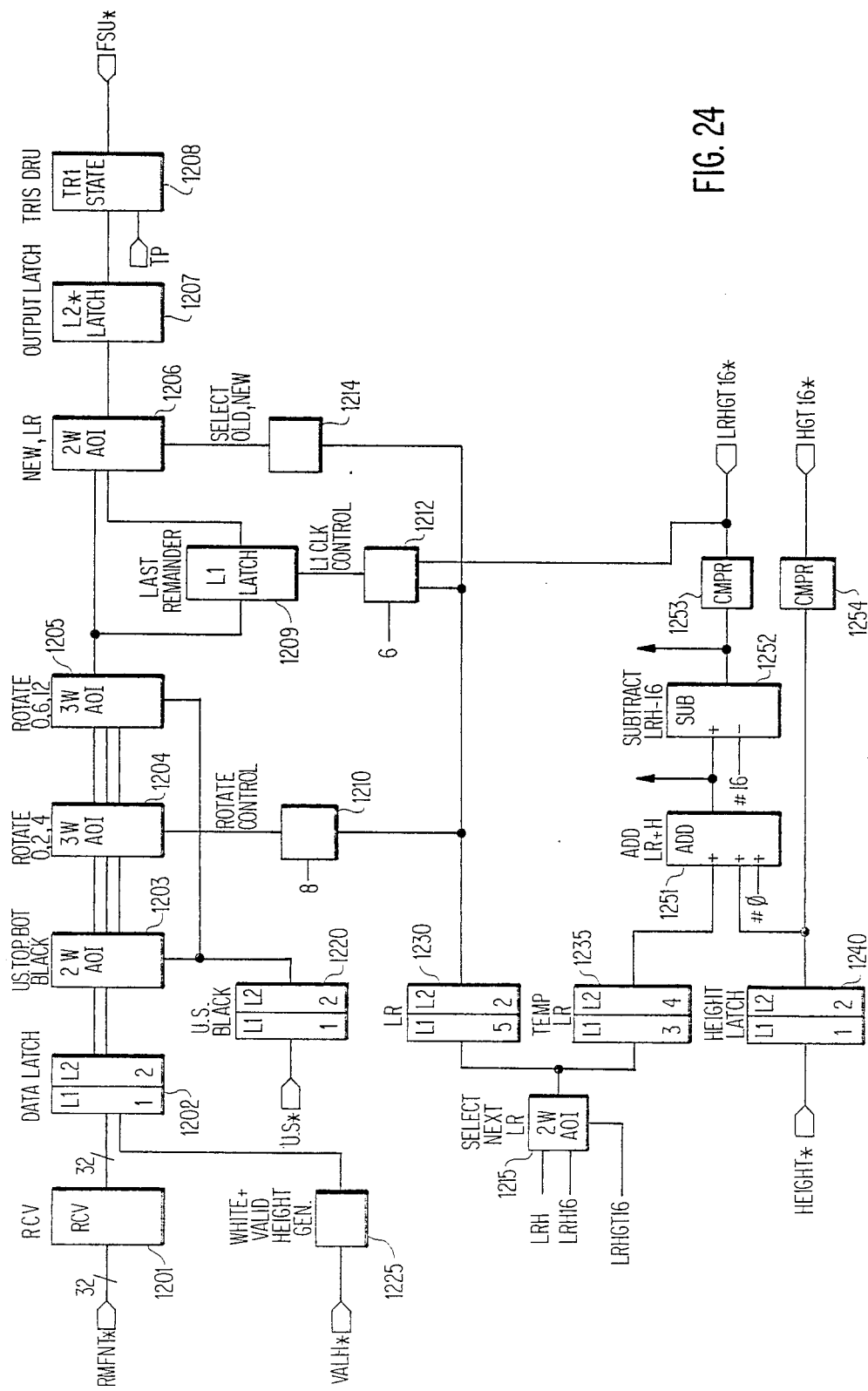
FIG. 24 is a block diagram of the aligner 120.

The aligner 120 is shown in detailed block diagram fashion in FIG. 24. The major function of the aligner 120 is, in response to receipt of image data from the font memory, which is 32 bits wide, to align it into 16-bit width data which is suitable for storage in the scan buffer. The aligner also generates underscores and may fill selected regions with white, as necessary.

In the general case, each fetch from the font consists of 32-bit wide data. Data however may be less than 32 bits wide on the last "slice", if that slice is not a full 32 bits. Because in general the font provides 32 bits of data, and the scan buffer will only accept 16 bits at a time, the aligner 120 may provide two 16-bit words to the scan buffer for every 32-bit word it receives.

To the extent that valid data from the font is not passed on to the scan buffer, it remains in the last remainder latch 1209. Furthermore, the length of this last remainder is maintained in the LR latches 1230 (the manner in which this quantity is calculated will be described). The SAL logic passes on to the aligner the quantity "valid height". The total height (input to the height latch 1240) indicates how tall the character box is. Each time the aligner outputs 16 bits of character data, a comparator 1254 decrements the height by 16 and produces the signal HGT16*. Based on the last remainder, the rotate control 1210 operates the latches 1204 and 1205 to "rotate" the incoming data to align it in a predetermined fashion. More particularly, the data is shifted up to make "room" for the length of the last remainder. The register 1204 provides for rotation by 0, 2 or 4 bits and the register 1205 provides for rotation by 0, 6 or 12 bits. Accordingly, any rotation between 0 and 14 bits, in steps of 2, can be accomplished. The new data, as rotated, is merged with the last remainder 1209 in the register 1206 and is latched into the latch 1207. If the sum of the length of the last remainder plus the length of valid new data is greater than 16, then the full 16 bits can be output to the scan buffer; and these 16 bits now reside in the latch 1207. To the extent that data is rotated above the 16th bit, it is rotated down to the bottom of the L1 latch 1209 and becomes the new last remainder. If the total font data is greater than 16 bits, then a second cycle is performed. If the total height is greater than 16 bits, then there will be a last remainder regardless of the "last" last remainder, and that will reside in the last remainder latch. If on that second cycle there is 16 bits of data, it will be fed through the output latch 1207 to the scan buffer. If the last remainder plus the input data are not 16 bits wide, then the last remainder is left in the L1 latch 1209 and the remaining part of the font data is rotated upward and latched into the L1 latch 1209 above the old last remainder, and the new length of the last remainder is the sum of the two.

The calculation logic is shown at the bottom of the figure. The last remainder, from the register 1230, is used to control the rotate logic 1210, the latch L1 clock control 1212 and the select old, new control 1214. The total height is input to the latch 1240, and the output of comparator 1254 indicates whether the height is greater than 16; if it is a second cycle is needed. Another output from the height latch 1240 is provided to the summer 1251 where it is added to the last remainder. The sum is input to the multiplexer 1215, and also input to a subtracter 1252 wherein the difference between the sum and the quantity 16 is computed. The output of the subtracter 1252 forms another input to the multiplexer 1215. In addition, the comparator 1253 determines the difference between the output of subtracter 1252 and the quantity 16, the output is used in the L1 latch clock control 1212 and another input to the multiplexer 1215.

The aligner 120 also performs the functions of selectively whiting out the font data, blackening it for underscoring it. These functions are performed in an order of priority, in descending order:

Total Height
All Black
Underscore
All White
Valid Height

If the valid height is less than the total height, then the area between the two should be filled with white. The WHITE* indicates the extent of this fill area and is used to fill the latch 1202.

The underscore bits identified by the US* code in the register 1220 control the appropriate bits in the registers 1203, 1205. This may provide for different types of underscore, single or double, at various locations.

The foregoing specification has described one embodiment of a universal character generator which can be used with a wide variety of printers regardless of the specific limitations of the printer as to paper orientation relative to the printhead, paper feed direction, etc. The character generator is insensitive to these printer limitations in that it is capable of providing a binary signal stream in which the make up of the binary signal stream can be any combination of scan direction and scan progression, that is all eight possible print cases are handled by the character generator. As has been described, however, it is of course necessary to format the CPE table in accordance with the specific selected print command, e.g. the same document will have different CPE tables depending on the print command. Those skilled in the art will appreciate, after reviewing the specification, that many changes can be made without departing from the spirit and scope of the invention which is to be construed in accordance with the attached claims.

Having thus described our invention, what we claim as new, and desire to secure by Letters Patent is:

1. An apparatus for generating symbols to be image on an output device in successive rows of symbols, scanned in a raster fashion along successive scan lines in which said scan lines can be parallel to said rows of symbols and directed left to right, successive scan lines progressing from top to bottom or vice versa, or said scan lines can be perpendicular to said rows of symbols and directed top to bottom, successive scan lines progressing left to right or vice versa, said apparatus including:

a page buffer containing a representation of said symbols in a predetermined order, each such representation including an address escape pointer, a column position escape memory specifying for each of said rows of symbols a page buffer pointer to a first symbol in said row and a height factor identifying a space allotted for presentation of said symbol row, an address escape memory with a record for each different symbol containing a font pointer and a representation of space allotted for said symbol in orthogonal directions, a font memory with a record for each symbol providing a graphic representation of said symbol in at least two orientations, means for storing a print command specifying a specific relation between scan direction, scan progression and rows of symbols, first means responsive to said print command for accessing said column position escape memory to identify said first symbol for a selected row of symbols by said page buffer pointer, second means responsive to said first means for accessing a corresponding entry in said page buffer including said address escape pointer, third means responsive to said second means for accessing said address escape memory to derive font addressing information, addressing means responsive to said print command and to said second and third means and to said font memory for deriving output information, said addressing means including means for successively deriving different font addresses for a given symbol until a quantity of data extracted from said font memory bears a specified relation to data extracted from said address escape memory, said addressing means further including means for developing fill bits for insertion into said output information, said fill bits related to a difference between said data extracted from said address escape memory related to a dimension of said symbol and said line height data from said column escape memory whereby spacing of rows of symbols may be freely selected to be larger than a dimension of any symbol on said row.

2. The apparatus of claim 1 which further includes aligning means responsive to data from said font memory and said third means for determining a relation between said line height of a symbol row and a dimension of said symbol, and for limiting said output information to exclude any data from said font memory in excess of a line height for said symbol row whereby line height can be freely selected to be less than a relevant dimension to said symbol.

3. The apparatus of claim 1 wherein said print command may selectively require symbols imaged on said output device to be proportionately larger than a size of said symbols imaged by another print command, said apparatus further comprising:
  scan buffer means responsive to said output data for having written therein said output data in a first order,
  reading means for reading out data stored in said scan buffer means,
  control means responsive to said print command for controlling said reading means to successively read said scan buffer means in the event said print command selects said proportionately larger symbols.

4. The apparatus of claim 3 in which said print command selectively requires said larger symbols of at least two different sizes, wherein said control means includes means to control successive reading by said reading means depending on said print command.

5. The apparatus of claim 3 in which said proportionately larger symbols are larger in either or both of two dimensions, which further includes
  expand means responsive to print commands requiring larger symbols in a given dimension for serializing data from said reading means, said expand means including means multiply responsive to each bit read by said reading means by a factor related to an increase in said symbol size in said given direction, whereby said control means determines symbol size multiplication in one dimension and said expand means determines symbol multiplication in said given dimension.

6. In a printer, a character generator for generating a binary signal stream representing symbols to be imaged on an output medium wherein said medium may include rows of symbols of selectively differing height wherein said height is not restricted by a dimension of said symbols as stored in a font library and which is capable of supporting scanning said medium in any one of eight cases consisting of:
  scanning said record parallel or perpendicular to rows of symbols of said medium, with said scans directed right to left or vice versa, said scan progressing top to bottom or vice versa,
  said character generator comprising:
  print command register means for storing a print command identifying a selected one of said eight print cases,
  memory means for storing a plurality of data arrays including:
    (1) a page buffer with an address escape pointer representing symbols to appear in said medium in a predetermined order,
    (2) a column position escape memory with a record for each symbol row to appear in said medium, each said record including a page buffer pointer identifying a symbol in said row, and a height factor for said row,
    (3) an address escape memory with a record for each symbol including a font reference address identifying a corresponding record in a font memory and second and third fields representing a space allotted for said symbol in two dimensions,
    (4) a font memory with a record for each symbol representing an appearance for said symbol,
  first means responsive to said print command register means for accessing data arrays of said memory means to extract from said font memory selected of said records for selected symbols, said first means including:
  addressing means for addressing said font memory to extract portions of said selected records in an order determined by data read from said page buffer, column position escape and address escape memories,
  scan buffer means written with data extracted from said font memory, and reversible scan buffer addressing means for reading said scan buffer means in one of two opposite directions in response to said print command register means.

7. A method for generating symbols to be imaged on an output device in successive rows of symbols, scanned in a raster fashion along successive scan lines in which said scan lines can be parallel to said rows of symbols and directed left to right, successive scan lines progressing from top to bottom or vice versa, or said scan lines can be perpendicular to said rows of symbols and directed top to bottom, successive scan lines progressing left to right or vice versa, said method including:
  storing and providing selective access to a page buffer containing a representation of said symbols in a predetermined order, each such representation including an address escape pointer,
  storing and providing selective access to a column position escape memory specifying for each of said rows of symbols a representation of a first symbol in said row and a height factor identifying a space allotted for presentation including a page buffer pointer,
  storing and providing selective access to an address escape memory specifying for each different symbol a font pointer and a representation of space allotted for said symbol in orthogonal directions,
  storing and providing selective access to a font memory specifying for each symbol a graphic representation of said symbol,
  accessing said column position escape memory in response to a print command specifying a specific relation between scan direction, scan progression and said rows of symbols to identify said first symbol for a selected row by said page buffer pointer,
  accessing a corresponding entry in said page buffer including said address escape pointer in response to the prior step,
  accessing said address escape and font memories in response to the prior step to select a predetermined portion of a corresponding graphic representation, and deriving output information related to said portion of said graphic representation, deriving additional output information for additional symbols in response to said print command and to information accessed in prior steps, including:

successively deriving different font addresses for a given symbol until a quantity of data extracted bears a specified relation to data extracted from said address escape memory, developing fill bits for insertion into said output information, said fill bits related to the difference between said data extracted from said address escape memory related to a dimension of said symbol and said line height data from said column escape memory whereby symbol row spacing may be freely selected to be larger than a dimension of any symbol on said row.

8. The method of claim 7 which further includes selectively aligning data from said font memory including the step of determining a relation between said line height of said symbol row and a dimension of said symbol, and, based on said relation limiting said output information to exclude any data from said font memory in excess of a line height for said symbol row whereby line height can be freely selected to be less than a dimension of said symbol.

9. The method of claim 7 wherein said print command may selectively require symbols imaged on said output device to be proportionately larger than a size of said symbols imaged by another print command, said method further comprising:

storing said output data in a scan buffer in a first order, reading out data stored in said scan buffer, repeating said reading step in the event said print command selects said proportionately larger symbols.

10. The method of claim 9 in which said print command may selectively require said larger symbols of at least two different sizes, wherein said repetitive reading step includes more or less repetitive reading depending on said print command.

11. The method of claim 9 in which said proportionately larger symbols may be larger in either or both of two dimensions, which further includes:

serializing data from said reading step, for print commands requiring larger symbols in a given dimension multiplying, an effect for each bit read by a factor related to an increase in said symbol size in said given direction, whereby said repetitive reading effects symbol size in one dimension and said bit multiplication determines symbol size in said given dimension.

12. A method of generating a binary signal stream representing symbols to be imaged on an output medium wherein said medium may include symbol rows selectively differing height wherein said height is not restricted by a dimension of said symbols as stored in a font library and which is capable of supporting scanning said medium in any one of eight cases consisting of: scanning said medium parallel or perpendicular to rows of symbols of said medium, with said scans directed right to left or vice versa, said scans progressing top to bottom or vice versa, said method comprising the steps of:

(a) storing a print command identifying a selected one of said eight print cases, (b) storing for selective access a plurality of data arrays including:

(b1) a page buffer with an address escape pointer representing symbols to appear in said medium in a predetermined order, (b2) a column position escape memory with a record for each symbol row to appear in said medium, each record including a page buffer pointer identifying a symbol in said row, and a height factor for said row, (b3) an address escape memory with a record for each symbol with a font reference address identifying a corresponding entry in a font memory and second and third fields representing a space allotted for said symbol in two dimensions, (b4) said font memory with a record for each symbol representing an appearance for said symbol, (c) accessing data array of said memory means to extract from said font memory selected of said records for symbols selected in accordance with data extracted from other of said data arrays in response to said print command, said accessing step including:

(d) addressing said font memory to extract portions of said selected records in an order determined by data read from said page buffer, column position escape and address escape memories, (e) developing fill bits representing space between adjacent symbol rows by comparing a dimension of a symbol on a row with said height factor and concatenating said fill bits and data from said font memory to form image data, (f) writing said image data in a scan buffer, (g) and reading said scan buffer in one of two opposite directions in response to said print command.

13. The method of claim 12 in which step (d) includes:

(d1) comparing a quantity of data extracted from said font memory on a given scan for a given symbol with a field from said address escape memory and discarding font data in excess of said field from said address escape memory.

14. A method of claim 12 in which step (g) includes:

(g1) re-reading said scan buffer one or more times to magnify said symbols in a direction perpendicular to said scan.

15. The method of claim 12 in which step (g) includes:

(g1) multiply responding to each bit in said scan buffer by a variable factor to selectively magnify said symbols in a direction parallel to said scan direction.

* * * * *

UNITED STATES PATENT AND TRADEMARK OFFICE
CERTIFICATE OF CORRECTION

PATENT NO. : 4,841,453

DATED : June 20, 1989

INVENTOR(S) : Finlay et al

It is certified that error appears in the above-identified patent and that said Letters Patent is hereby corrected as shown below:

On the title page, item [57]:
Abstract, line 2, after "capability" insert -is disclosed-;

line 4, change "stram" to -stream-.

Col. 2, line 50, after "machine" insert -,-.

Col. 6, line 67, change "Fig. 1" to -Fig. 1B-.

Col. 7, line 35, change "shows" to -show-.

Col. 12, line 51, change "oases" to -cases-;

line 64, change "indicate" to -indicates-.

Col. 13, line 24, change "be" to -the-.

Col. 20, line 5, after "is" insert -a-;

line 7, after "in" insert -a-; change "ode" to -mode-.

Col. 21, lines 24-25, after "associated" insert -with-.

Col. 22, line 5, after "is" insert -to-.

Col. 24, line 20, after "greater" insert -than-;

line 25, change "alice" to -slice-;

line 39, change "address" to -addressed-.

Col. 25, line 17, after "more" insert -or-;

line 38, after "greater" (2nd) insert -than-.

UNITED STATES PATENT AND TRADEMARK OFFICE
CERTIFICATE OF CORRECTION

PATENT NO. : 4,841,453

DATED : June 20, 1989

INVENTOR(S) : Finlay et al

It is certified that error appears in the above-identified patent and that said Letters Patent is hereby corrected as shown below:

Col. 26, line 11, after "coupled" insert --to--;

line 32, after "printing" insert --,--.

Col. 27, line 29, after "pair" insert --of--;

line 30, change "y" to --by--;

line 55, after "either" insert --of--.

Col. 30, line 19, change "image" to --imaged--.

Col. 31, line 14, change "to" to --of--;

line 37, after "includes" insert --:--;

line 58, change "scan" to --scans--.

Col. 33, line 46, begin a new paragraph after "step,";

lines 47-48, change "dimension multiplying," to --dimension, multiplying--;

line 56, after "rows" insert --of--.

UNITED STATES PATENT AND TRADEMARK OFFICE
CERTIFICATE OF CORRECTION

PATENT NO. : 4,841,453
DATED : June 20, 1989
INVENTOR(S) : Finlay et al

It is certified that error appears in the above-identified patent and that said Letters Patent is hereby corrected as shown below:

Col. 34, line 25, change "array" to --arrays--;

line 50, change "A" to --The--.

Signed and Sealed this

Seventh Day of January, 1992

Attest:

HARRY F. MANBECK, JR.

*Attesting Officer*      *Commissioner of Patents and Trademarks*